United States Patent
Ikeyatsu et al.

(10) Patent No.: US 11,670,776 B2
(45) Date of Patent: Jun. 6, 2023

(54) BINDER AQUEOUS SOLUTION FOR LITHIUM-ION BATTERY ELECTRODE, SLURRY FOR LITHIUM-ION BATTERY NEGATIVE ELECTRODE, NEGATIVE ELECTRODE FOR LITHIUM-ION BATTERY, AND LITHIUM-ION BATTERY

(71) Applicant: ARAKAWA CHEMICAL INDUSTRIES, LTD., Osaka (JP)

(72) Inventors: Katsuhiko Ikeyatsu, Osaka (JP); Hideki Goda, Osaka (JP)

(73) Assignee: ARAKAWA CHEMICAL INDUSTRIES, LTD., Osaka (JP)

( * ) Notice: Subject to any disclaimer, the term of this patent is extended or adjusted under 35 U.S.C. 154(b) by 360 days.

(21) Appl. No.: 17/167,088

(22) Filed: Feb. 4, 2021

(65) Prior Publication Data
US 2021/0280872 A1    Sep. 9, 2021

(30) Foreign Application Priority Data

Mar. 9, 2020    (JP) .............................. JP2020-039573

(51) Int. Cl.
*H01M 4/62*     (2006.01)
*H01M 10/05*    (2010.01)
*H01M 10/0525*  (2010.01)
*H01M 4/02*     (2006.01)

(52) U.S. Cl.
CPC ....... *H01M 4/622* (2013.01); *H01M 10/0525* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 2018/0034058 A1 | 2/2018 | Suh et al. | |
| 2019/0273259 A1 | 9/2019 | Ohta et al. | |

FOREIGN PATENT DOCUMENTS

| | | | | |
|---|---|---|---|---|
| JP | 2004185810 | 7/2004 | | |
| JP | 2005259697 | 9/2005 | | |
| JP | 2013089437 | 5/2013 | | |
| JP | 2013168323 | 8/2013 | | |
| JP | 5390336 | 1/2014 | | |
| JP | 2015106488 | 6/2015 | | |
| JP | 2015118908 | 6/2015 | | |
| JP | 5903761 | 4/2016 | | |
| JP | 2018006334 | * | 1/2018 | ............ H01M 4/134 |
| KR | 20200013221 | * | 2/2020 | .......... H01M 10/052 |
| WO | 2015098507 | 7/2015 | | |
| WO | 2018131572 | 7/2018 | | |

OTHER PUBLICATIONS

"Office Action of Korea Counterpart Application", dated Apr. 25, 2021, with English translation thereof, p. 1-p. 9.
"Search Report of Europe Counterpart Application", dated Jun. 10, 2021, p. 1-p. 5.

* cited by examiner

*Primary Examiner* — Maria Laios
*Assistant Examiner* — Angela J Martin
(74) *Attorney, Agent, or Firm* — JCIPRNET

(57) ABSTRACT

Provided are a binder aqueous solution for a lithium-ion battery electrode, a slurry for a lithium-ion battery negative electrode, a negative electrode for a lithium-ion battery, and a lithium-ion battery. The binder aqueous solution for a lithium-ion battery electrode contains an acidic group-containing water-soluble polymer (A) and an amino group-containing water-soluble polymer (B). The acidic group-containing water-soluble polymer (A) is a polymer of a monomer group containing, with respect to 100 mol % of the monomer group, 30 mol % to 90 mol % of a (meth) acrylamide group-containing compound (a), 3 mol % to 20 mol % of an unsaturated organic acid (b), and 5 mol % to 40 mol % of an alkali metal or alkaline earth metal salt (c) of the unsaturated organic acid. A 1% by mass aqueous solution of the amino group-containing water-soluble polymer (B) has a pH of 9 or higher.

17 Claims, No Drawings

BINDER AQUEOUS SOLUTION FOR LITHIUM-ION BATTERY ELECTRODE, SLURRY FOR LITHIUM-ION BATTERY NEGATIVE ELECTRODE, NEGATIVE ELECTRODE FOR LITHIUM-ION BATTERY, AND LITHIUM-ION BATTERY

CROSS-REFERENCE TO RELATED APPLICATION

This application claims the priority benefit of Japan Application No. 2020-039573, filed on Mar. 9, 2020. The entirety of the above-mentioned patent application is hereby incorporated by reference herein and made a part of this specification.

BACKGROUND

Technical Field

The disclosure relates to a binder aqueous solution for a lithium-ion battery electrode, a slurry for a lithium-ion battery negative electrode, a negative electrode for a lithium-ion battery, and a lithium-ion battery.

Related Art

Lithium-ion batteries have a small size, light weight and high energy density, and further, are repeatedly chargeable and dischargeable, and are used in a wide range of applications. Hence, in recent years, improvements to battery members such as electrodes or the like have been studied with the aim of improving the performance of lithium-ion batteries.

The positive electrode and negative electrode of a lithium-ion battery are both produced in the following manner. A slurry prepared by dispersing an electrode active material and a binder resin in a solvent is applied on both sides of a current collector (for example, a metal foil), and after the solvent is dried and removed to form an electrode layer, the resultant is compression-molded by a roll press machine or the like.

In recent years, in an electrode for a lithium-ion battery, various electrode active materials have been proposed from the viewpoint of increasing battery capacity. However, depending on the electrode active material, the electrode for a lithium-ion battery is likely to expand and contract with charging and discharging. Hence, the electrode for a lithium-ion battery that is likely to expand and contract with charging and discharging undergoes a volume change (springback) from the initial stage of repetition of charging and discharging, and a lithium-ion battery using the above electrode is likely to deteriorate in electrical characteristics such as cycle characteristics or the like.

Therefore, in this field, studies have been made to solve the above problem by binder resins. For example, it has been proposed that good charge and discharge characteristics can be obtained by using polyacrylamide (Patent Documents 1 and 2) as a binder of a water-soluble resin. In addition, with respect to expansion and contraction of an active material associated with charging and discharging, it has been proposed to suppress the expansion by adding a crosslinker to a particulate resin being a binder resin (Patent Document 3). The crosslinker usually causes a crosslinking reaction in the drying step after the slurry composition is applied to the current collector, and forms crosslinks between particles of the particulate resin or the like.

PATENT DOCUMENTS

[Patent Document 1] Japanese Patent Laid-open No. 2015-118908
[Patent Document 2] Japanese Patent Laid-open No. 2015-106488
[Patent Document 3] WO 2015/098507

However, when crosslinking is performed using a crosslinker, flexibility of the binder resin is reduced, and as a result, a problem may occur in which adhesion to the electrode is reduced. Also, in the related art, dispersion stability of the slurry was not sufficient. In addition, the binder has been required to impart good initial Coulombic efficiency to the lithium-ion battery.

Therefore, problems to be solved by the disclosure include to provide a binder aqueous solution for a lithium-ion battery, the binder aqueous solution imparting good initial Coulombic efficiency to a lithium-ion battery, imparting good electrode adhesion to an electrode, and imparting good dispersion stability to a slurry.

As a result of earnest studies, the present inventors have found that the above problems can be solved.

SUMMARY

The disclosure provides the following items.
(Item 1)
A binder aqueous solution for a lithium-ion battery, containing: an acidic group-containing water-soluble polymer (A) being a polymer of a monomer group containing, with respect to 100 mol % of the monomer group, 30 mol % to 90 mol % of a (meth)acrylamide group-containing compound (a), 3 mol % to 20 mol % of an unsaturated organic acid (b), and 5 mol % to 40 mol % of an alkali metal or alkaline earth metal salt (c) of the unsaturated organic acid; and an amino group-containing water-soluble polymer (B), a 1% by mass aqueous solution thereof having a pH of 9 or higher.
(Item 2)
The binder aqueous solution for a lithium-ion battery as described in the above Item, wherein an acidic group to amino group molar ratio of an acidic group contained in the acidic group-containing water-soluble polymer (A) to an amino group contained in the amino group-containing water-soluble polymer (B) is 1 to 15.
(Item 3)
The binder aqueous solution for a lithium-ion battery as described in any one of the above Items, wherein the amino group-containing water-soluble polymer (B) has a molecular weight of 1,600 to 50,000.
(Item 4)
The binder aqueous solution for a lithium-ion battery as described in any one of the above Items, wherein a residue rate upon impregnation of the amino group-containing water-soluble polymer (B) with dimethyl carbonate at 25° C. for 24 hours is 20% by mass or more.
(Item 5)
The binder aqueous solution for a lithium-ion battery as described in any one of the above Items, wherein the amino group-containing water-soluble polymer (B) is polyallylamine.
(Item 6)
A slurry for a lithium-ion battery negative electrode, containing: the binder aqueous solution for a lithium-ion battery electrode as described in any one of the above Items, and a negative electrode active material (C).
(Item 7)
A negative electrode for a lithium-ion battery, obtained by applying the slurry for a lithium-ion battery negative electrode as described in the above Item to a metal foil and drying the same.
(Item 8)
A lithium-ion battery including the negative electrode for a lithium-ion battery as described in the above Item.

In the disclosure, one or more of the features described above may be provided in combination in addition to the specified combinations.

The binder aqueous solution for a lithium-ion battery according to the present embodiment is capable of imparting excellent dispersion stability to a slurry for a lithium-ion battery negative electrode. In addition, the slurry for a lithium-ion battery negative electrode according to the present embodiment has excellent dispersion stability. Furthermore, the negative electrode according to the present embodiment has excellent adhesion. The battery according to the present embodiment has excellent initial Coulombic efficiency.

DESCRIPTION OF THE EMBODIMENTS

Throughout the disclosure, ranges of numerical values such as physical property values and content may be suitably set (for example, selected from the upper and lower limit values described in each item below). Specifically, regarding a numerical value a, when the upper limit and lower limit of the numerical value a are, for example, A4, A3, A2, and A1 (wherein A4>A3>A2>A1), the numerical value a is in a range of, for example, A4 or less, A3 or less, A2 or less, A1 or more, A2 or more, A3 or more, A1 to A2, A1 to A3, A1 to A4, A2 to A3, A2 to A4, and A3 to A4.

[Binder Aqueous Solution for Lithium-Ion Battery Electrode]

The disclosure provides a binder aqueous solution for a lithium-ion battery, containing: an acidic group-containing water-soluble polymer (A) being a polymer of a monomer group containing, with respect to 100 mol % of the monomer group, 30 mol % to 90 mol % of a (meth)acrylamide group-containing compound (a), 3 mol % to 20 mol % of an unsaturated organic acid (b), and 5 mol % to 40 mol % of an alkali metal or alkaline earth metal salt (c) of the unsaturated organic acid; and an amino group-containing water-soluble polymer (B), a 1% by mass aqueous solution thereof having a pH of 9 or higher.

<Acidic Group-Containing Water-Soluble Polymer (A): Also Referred to as Component (A)>

In the disclosure, "acidic group" means a group having ionizable hydrogen atoms as hydrogen ions and in which no hydrogen atom has ionized. Examples of the acidic group include carboxyl group ($-CO_2H$), sulfonic acid group ($-SO_3H$), and phosphoric acid group ($-PO_3H$).

On the other hand, "acid group" means a group having ionizable hydrogen atoms as hydrogen ions and in which one or more hydrogen atoms have ionized. Examples of the acid group include $-CO_2^-$, $-SO_3^-$, and $-PO_3^-$.

In the disclosure, "water-soluble" means having an insoluble content of less than 0.5% by mass (less than 2.5 mg) when 0.5 g of a compound thereof is dissolved in 100 g of water at 25° C.

In the case where the component (A) is not water-soluble, since it does not dissolve in water, no aqueous solution is formed at all. As a result, the component (A) does not contribute to dispersion of the slurry. In addition, viscosity required for application of the slurry to a current collector cannot be imparted to the slurry.

When 0.5 g of the component (A) is dissolved in 100 g of water, the insoluble content of the component (A) is, for example, less than 0.5% by mass, less than 0.4% by mass, less than 0.3% by mass, less than 0.2% by mass, less than 0.1% by mass, or 0% by mass.

In the disclosure, "(meth)acryl" means "at least one selected from the group consisting of acryl and methacryl." Similarly, "(meth)acrylate" means "at least one selected from the group consisting of acrylate and methacrylate." "(Meth)acryloyl" means "at least one selected from the group consisting of acryloyl and methacryloyl."

<(Meth)Acrylamide Group-Containing Compound (a): Also Referred to as Component (a)>

In the disclosure, "(meth)acrylamide group-containing compound" means a compound having a (meth)acrylamide group. The (meth)acrylamide group-containing compound may be used singly or in combination of two or more kinds thereof.

In one embodiment, the (meth)acrylamide group-containing compound is expressed by the following structural formula:

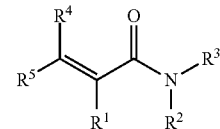

(In the formula, $R^1$ is a hydrogen atom or a methyl group; $R^2$ and $R^3$ are each independently a hydrogen atom, a substituted or unsubstituted alkyl group, or an acetyl group, or a group in which $R^2$ and $R^3$ form a ring structure together; $R^4$ and $R^5$ are each independently a hydrogen atom, a substituted or unsubstituted alkyl group, a hydroxy group, an amino group ($-NR^aR^b$ (wherein $R^a$ and $R^b$ are each independently a hydrogen atom or a substituted or unsubstituted alkyl group)), or an acetyl group. Examples of a substituent of the substituted alkyl group include hydroxy group, amino group, and acetyl group. In addition, examples of the group in which $R^2$ and $R^3$ form a ring structure together include morpholyl group.)

Examples of the alkyl group include linear alkyl group, branched alkyl group, and cycloalkyl group.

The linear alkyl group is expressed by a general formula of $-C_nH_{2n+1}$ (wherein n is an integer of 1 or more). Examples of the linear alkyl group include methyl group, ethyl group, propyl group, n-butyl group, n-pentyl group, n-hexyl group, n-heptyl group, n-octyl group, n-nonyl group, and n-decamethyl group.

The branched alkyl group is a group in which at least one hydrogen atom of a linear alkyl group is substituted with an alkyl group. Examples of the branched alkyl group include i-propyl group, i-butyl group, s-butyl group, t-butyl group, diethylpentyl group, trimethylbutyl group, trimethylpentyl group, and trimethylhexyl group.

Examples of the cycloalkyl group include monocyclic cycloalkyl group, crosslinked cyclic cycloalkyl group, and condensed cyclic cycloalkyl group.

In the disclosure, "monocyclic" means having a cyclic structure formed by covalent bonding of carbons and without crosslinking structure therein. "Condensed cyclic" means having a cyclic structure in which two or more single rings share two atoms (that is, only one side of each ring is shared (condensed) with each other). "Crosslinked cyclic" means having a cyclic structure in which two or more single rings share three or more atoms.

Examples of the monocyclic cycloalkyl group include cyclopentyl group, cyclohexyl group, cycloheptyl group, cyclodecyl group, and 3,5,5-trimethylcyclohexyl group.

Examples of the crosslinked cyclic cycloalkyl group include tricyclodecyl group, adamantyl group, and norbornyl group.

Examples of the condensed cyclic cycloalkyl group include bicyclodecyl group.

Examples of the above (meth)acrylamide group-containing compound (a) include (meth)acrylamide, N-isopropyl (meth)acrylamide, N,N-dimethyl(meth)acrylamide, N,N-diethyl(meth)acrylamide, N,N-dimethylaminopropyl(meth)acrylamide, N-methylol(meth)acrylamide, diacetone(meth)acrylamide, maleic acid amide, (meth)acryloylmorpholine, hydroxyethyl(meth)acrylamide, and a salt thereof. Examples of the above salt include dimethylaminopropyl(meth)acrylamide methyl chloride quaternary salt and dimethylaminoethyl (meth)acrylate benzyl chloride quaternary salt. Among them, when (meth)acrylamide especially acrylamide is used, a binder can be prepared which not only reduces water absorption while maintaining water solubility, but also reduces irreversible capacity, has a high interaction with an electrode active material, and improves the dispersibility of slurry or the binding property between electrode active materials inside an electrode.

The upper limit and lower limit of the content of the (meth)acrylamide group-containing compound with respect to 100 mol % of the monomer group are, for example, 90 mol %, 89.95 mol %, 85 mol %, 80 mol %, 75 mol %, 70 mol %, 65 mol %, 60 mol %, 59.95 mol %, 55 mol %, 50 mol %, 45 mol %, 40 mol %, 35 mol %, and 30 mol %. In one embodiment, the above content is preferably 30 mol % to 90 mol %.

The upper limit and lower limit of the content of the (meth)acrylamide group-containing compound with respect to 100% by mass of the monomer group are, for example, 90% by mass, 85% by mass, 80% by mass, 75% by mass, 70% by mass, 65% by mass, 60% by mass, 55% by mass, 50% by mass, 45% by mass, 40% by mass, 35% by mass, 30% by mass, 25% by mass, and 20% by mass. In one embodiment, the above content is preferably 20% by mass to 90% by mass.

<Unsaturated Organic Acid (b): Also Referred to as Component (b)>

In the disclosure, an unsaturated organic acid means a compound having an acidic group and a polymerizable unsaturated bond. The unsaturated organic acid may be used singly or in combination of two or more kinds thereof.

The acidic group contained in the unsaturated organic acid (b) corresponds to the acidic group contained in the component (A). The acidic group contained in a constituent unit derived from the component (b) in the component (A), that is, the acidic group contained in the component (A), interacts with an amino group of the amino group-containing water-soluble polymer (B).

Examples of the unsaturated organic acid include unsaturated carboxylic acid, unsaturated sulfonic acid, and unsaturated phosphoric acid.

Examples of the unsaturated carboxylic acid include (meth)acrylic acid, crotonic acid, maleic acid, fumaric acid, and itaconic acid.

Examples of the unsaturated sulfonic acid include: α,β-ethylenically unsaturated sulfonic acid, such as vinylsulfonic acid, styrenesulfonic acid, (meth)allylsulfonic acid; (meth)acrylamide t-butylsulfonic acid, 2-(meth)acrylamide-2-methylpropanesulfonic acid, 2-(meth)acrylamide-2-hydroxypropanesulfonic acid, 3-sulfopropane(meth)acrylic ester, and bis-(3-sulfopropyl)itaconic ester.

Examples of the unsaturated phosphoric acid include vinylphosphonic acid, vinyl phosphate, bis((meth)acryloxyethyl) phosphate, diphenyl-2-(meth)acryloyloxyethyl phosphate, dibutyl-2-(meth)acryloyloxyethyl phosphate, dioctyl-2-(meth)acryloyloxyethyl phosphate, monomethyl-2-(meth)acryloyloxyethyl phosphate, and 3-(meth)acryloxy-2-hydroxypropanephosphoric acid.

In the disclosure, a compound corresponding to both a (meth)acrylamide group-containing compound and an unsaturated organic acid is regarded as an unsaturated organic acid.

The upper limit and lower limit of the content of the unsaturated organic acid (b) with respect to 100 mol % of the monomer group are, for example, 20 mol %, 19 mol %, 17 mol %, 15 mol %, 14 mol %, 12 mol %, 11 mol %, 10 mol %, 9 mol %, 7 mol %, 5 mol %, 4 mol %, and 3 mol %. In one embodiment, from the viewpoint of suppressing insolubilization, gelation, deterioration of dispersibility of slurry, deterioration of electrode adhesion, and reduction of irreversible capacity, the above content is more preferably 3 mol % to 20 mol %.

The upper limit and lower limit of the content of the unsaturated organic acid (b) with respect to 100% by mass of the monomer group are, for example, 30% by mass, 29% by mass, 27% by mass, 25% by mass, 23% by mass, 20% by mass, 19% by mass, 17% by mass, 15% by mass, 13% by mass, 10% by mass, 9% by mass, 7% by mass, 5% by mass, 3% by mass, and 2% by mass. In one embodiment, the above content is preferably 2% by mass to 30% by mass.

The upper limit and lower limit of the number of moles derived from the component (b) per 1 g of the component (A) are, for example, 1.8 mmol/g, 1.7 mmol/g, 1.5 mmol/g, 1.49 mmol/g, 1.4 mmol/g, 1.3 mmol/g, 1.28 mmol/g, 1.2 mmol/g, 1 mmol/g, 0.9 mmol/g, 0.7 mmol/g, 0.69 mmol/g, 0.5 mmol/g, 0.41 mmol/g, 0.4 mmol/g, 0.38 mmol/g, and 0.3 mmol/g. In one embodiment, the above number of moles is preferably 0.3 mmol/g to 1.8 mmol/g.

<Alkali Metal or Alkaline Earth Metal Salt (c) of Unsaturated Organic Acid: Also Referred to as Component (c)>

An alkali metal or alkaline earth metal salt of an unsaturated organic acid may be used singly or in combination of two or more kinds thereof.

Examples of the unsaturated organic acid include those mentioned above.

Examples of the alkali metal include lithium, sodium, and potassium.

Examples of the alkaline earth metal include magnesium, and calcium.

The upper limit and lower limit of the content of the alkali metal or alkaline earth metal salt of the unsaturated organic acid with respect to 100 mol % of the monomer group are, for example, 40 mol %, 35 mol %, 30 mol %, 25 mol %, 20 mol %, 15 mol %, 10 mol %, 5 mol %, and 0 mol %. In one embodiment, from the viewpoints of improving water solubility and dispersibility of slurry as well as suppressing deterioration of electrode adhesion and deterioration of water absorption, the above content is preferably 5 mol % to 40 mol %.

The upper limit and lower limit of the content of the alkali metal or alkaline earth metal salt of the unsaturated organic acid with respect to 100% by mass of the monomer group are, for example, 70% by mass, 65% by mass, 60% by mass, 55% by mass, 50% by mass, 45% by mass, 40% by mass, 35% by mass, 30% by mass, 25% by mass, 20% by mass, 15% by mass, 10% by mass, and 5% by mass. In one embodiment, the above content is preferably 5% by mass to 70% by mass.

<Hydroxyalkyl(meth)acrylate Having Hydroxyalkyl Group Having 2 to 4 Carbon Atoms>

Hydroxyalkyl(meth)acrylate having a hydroxyalkyl group having 2 to 4 carbon atoms may be used singly or in combination of two or more kinds thereof.

In the disclosure, "hydroxyalkyl group having 2 to 4 carbon atoms" refers to a group in which one of hydrogen atoms constituting an alkyl group having 2 to 4 carbon atoms is substituted with a hydroxy group.

Examples of the hydroxyalkyl(meth)acrylate having a hydroxyalkyl group having 2 to 4 carbon atoms include 1-hydroxyethyl(meth)acrylate, 2-hydroxyethyl(meth)acrylate, 1-hydroxypropyl(meth)acrylate, 2-hydroxypropyl(meth)acrylate, 3-hydroxypropyl(meth)acrylate, 2-hydroxy-1-methylethyl(meth)acrylate, 1-hydroxy-2-methylethyl(meth)acrylate, 1-hydroxybutyl(meth)acrylate, 2-hydroxybutyl(meth)acrylate, 3-hydroxybutyl(meth)acrylate, 4-hydroxybutyl(meth)acrylate, 1-hydroxy-1-methyl-propyl(meth)acrylate, 2-hydroxy-1-methyl-propyl(meth)acrylate, 3-hydroxy-1-methyl-propyl(meth)acrylate, 1-ethyl-2-hydroxyethyl(meth)acrylate, 1-hydroxy-2-methyl-propyl(meth)acrylate, 2-hydroxy-2-methyl-propyl(meth)acrylate, 3-hydroxy-2-methyl-propyl(meth)acrylate, and 1,1-dimethyl-2-hydroxyethyl(meth)acrylate.

The upper limit and lower limit of the content of the hydroxyalkyl(meth)acrylate having a hydroxyalkyl group having 2 to 4 carbon atoms with respect to 100 mol % of the monomer group are, for example, 40 mol %, 35 mol %, 30 mol %, 25 mol %, 20 mol %, 15 mol %, 10 mol %, 5 mol %, and 0 mol %. In one embodiment, the above content is preferably 0 mol % to 40 mol %.

The upper limit and lower limit of the content of the hydroxyalkyl(meth)acrylate having a hydroxyalkyl group having 2 to 4 carbon atoms with respect to 100% by mass of the monomer group are, for example, 40% by mass, 35% by mass, 30% by mass, 25% by mass, 20% by mass, 15% by mass, 10% by mass, 5% by mass, and 0% by mass. In one embodiment, the above content is preferably 0% by mass to 40% by mass.

<α,β-Unsaturated Nitrile>

An α,β-unsaturated nitrile may be used singly or in combination of two or more kinds thereof. The α,β-unsaturated nitrile can be suitably used for the purpose of imparting flexibility to an electrode.

Examples of the α,β-unsaturated nitrile include (meth)acrylonitrile, α-chloro(meth)acrylonitrile, α-ethyl(meth)acrylonitrile, and vinylidene cyanide. Among them, (meth)acrylonitrile is preferable, and acrylonitrile is particularly preferable.

The upper limit and lower limit of the content of the α,β-unsaturated nitrile with respect to 100 mol % of the monomer group are, for example, 40 mol %, 35 mol %, 30 mol %, 25 mol %, 20 mol %, 15 mol %, 10 mol %, 5 mol %, and 0 mol %. In one embodiment, the above content is preferably 0 mol % to 40 mol %.

The upper limit and lower limit of the content of the α,β-unsaturated nitrile with respect to 100% by mass of the monomer group are, for example, 30% by mass, 25% by mass, 20% by mass, 15% by mass, 10% by mass, 5% by mass, and 0% by mass. In one embodiment, the above content is preferably 0% by mass to 30% by mass.

<Relative Ratio of Monomer Components>

The upper limit and lower limit of a molar ratio [amount of substance of component (b)/amount of substance of component (a)] between the component (b) and the component (a) contained in the monomer group are, for example, 0.67, 0.65, 0.6, 0.5, 0.4, 0.3, 0.2, 0.1, 0.09, 0.05, and 0.03. In one embodiment, the above molar ratio is preferably 0.03 to 0.67.

The upper limit and lower limit of a molar ratio [amount of substance of component (c)/amount of substance of component (a)] between the component (c) and the component (a) contained in the monomer group are, for example, 1.33, 1.3, 1.2, 1.1, 1, 0.9, 0.7, 0.5, 0.4, 0.3, 0.2, 0.1, 0.09, 0.07, and 0.05. In one embodiment, the above molar ratio is preferably 0.05 to 1.33.

The upper limit and lower limit of a molar ratio [amount of substance of component (c)/amount of substance of component (b)] between the component (c) and the component (b) contained in the monomer group are, for example, 13.3, 13, 11, 10, 9, 7, 5, 4, 3, 2, 1, 0.9, 0.7, 0.5, 0.4, 0.3, and 0.25. In one embodiment, the above molar ratio is preferably 0.25 to 13.3.

The upper limit and lower limit of a mass ratio [mass of component (b)/mass of component (a)] between the component (b) and the component (a) contained in the monomer group are, for example, 1.5, 1, 0.9, 0.5, 0.2, 0.1, 0.09, 0.05, 0.04, and 0.02. In one embodiment, the above mass ratio is preferably 0.02 to 1.5.

The upper limit and lower limit of a mass ratio [mass of component (c)/mass of component (a)] between the component (c) and the component (a) contained in the monomer group are, for example, 3.5, 3, 2.5, 2, 1.5, 1, 0.9, 0.5, 0.2, 0.1, 0.09, and 0.05. In one embodiment, the above mass ratio is preferably 0.05 to 3.5.

The upper limit and lower limit of a mass ratio [mass of component (c)/mass of component (b)] between the component (c) and the component (b) contained in the monomer group are, for example, 35, 30, 25, 20, 15, 10, 5, 2, 1.5, 1, 0.9, 0.5, 0.2, and 0.16. In one embodiment, the above mass ratio is preferably 0.16 to 35.

<Monomers Corresponding to None of the Above: Also Referred to as Other Components>

In the above monomer group, monomers (other components) that correspond to none of the components (a) to (c), the hydroxyalkyl(meth)acrylate having a hydroxyalkyl group having 2 to 4 carbon atoms, and the α,β-unsaturated nitrile may be used as long as the desired effects of the disclosure are not impaired. As the other components, various known ones may be used singly or in combination of two or more thereof.

Examples of the other components include a hydroxyl group-free unsaturated carboxylic ester, a conjugated diene, and an aromatic vinyl compound.

The hydroxyl group-free unsaturated carboxylic ester is preferably a hydroxyl group-free (meth)acrylic ester. Examples of the hydroxyl group-free (meth)acrylic ester include a hydroxyl group-free linear (meth)acrylic ester, a hydroxyl group-free branched (meth)acrylic ester, a hydroxyl group-free alicyclic (meth)acrylic ester, and a hydroxyl group-free substituted (meth)acrylic ester.

Examples of the hydroxyl group-free linear (meth)acrylic ester include methyl (meth)acrylate, ethyl (meth)acrylate, n-propyl (meth)acrylate, n-butyl (meth)acrylate, n-amyl (meth)acrylate, hexyl (meth)acrylate, n-octyl (meth)acrylate, nonyl (meth)acrylate, and decyl (meth)acrylate.

Examples of the hydroxyl group-free branched (meth) acrylic ester include i-propyl (meth)acrylate, i-butyl (meth) acrylate, i-amyl (meth)acrylate, and 2-ethylhexyl (meth) acrylate.

Examples of the hydroxyl group-free alicyclic (meth) acrylic ester include cyclohexyl (meth)acrylate.

The hydroxyl group-free unsaturated carboxylic ester can be suitably used for the purpose of imparting flexibility to an electrode. From the above viewpoint, the content of the hydroxyl group-free unsaturated carboxylic ester with respect to 100 mol % of the above monomer group is preferably less than 40 mol % (for example, less than 30 mol %, less than 20 mol %, less than 19 mol %, less than 15 mol %, less than 10 mol %, less than 5 mol %, less than 1 mol %, or 0 mol %).

In addition, the content of the hydroxyl group-free unsaturated carboxylic ester with respect to 100% by mass of the above monomer group is preferably 40% by mass or less (for example, less than 30% by mass, less than 20% by mass, less than 19% by mass, less than 15% by mass, less than 10% by mass, less than 5% by mass, less than 1% by mass, or 0% by mass).

Examples of the conjugated diene include 1,3-butadiene, 2-methyl-1,3-butadiene, 2,3-dimethyl-1,3-butadiene, 2-chloro-1,3-butadiene, a substituted linear conjugated pentadiene, and a substituted and side chain conjugated hexadiene.

From the viewpoint of cycle characteristics of the lithium-ion battery, the content of the conjugated diene with respect to 100 mol % of the above monomer group is preferably less than 10 mol %, more preferably 0 mol %.

The upper limit and lower limit of the content of the conjugated diene with respect to 100% by mass of the above monomer group are, for example, 30% by mass, 20% by mass, 10% by mass, 5% by mass, 1% by mass, and 0% by mass. In one embodiment, the above content is preferably 0% by mass to 30% by mass.

In addition, examples of the aromatic vinyl compound include styrene, α-methylstyrene, p-methylstyrene, vinyltoluene, chlorostyrene, and divinylbenzene.

From the viewpoint of cycle characteristics of the lithium-ion battery, the content of the aromatic vinyl compound with respect to 100 mol % of the above monomer group is preferably less than 10 mol %, more preferably 0 mol %.

The upper limit and lower limit of the content of the aromatic vinyl compound with respect to 100% by mass of the above monomer group are, for example, 30% by mass, 20% by mass, 10% by mass, 5% by mass, 1% by mass, and 0% by mass. In one embodiment, the above content is preferably 0% by mass to 30% by mass.

A ratio of the other components than the hydroxyl group-free unsaturated carboxylic ester, the conjugated diene and the aromatic vinyl compound mentioned above in the above monomer group is, for example, less than 10 mol %, less than 5 mol %, less than 2 mol %, less than 1 mol %, less than 0.1 mol %, less than 0.01 mol %, and 0 mol %, with respect to 100 mol % of the above monomer group. In addition, with respect to 100% by mass of the above monomer group, the ratio of the other components is, for example, less than 10% by mass, less than 9% by mass, less than 7% by mass, less than 5% by mass, less than 4% by mass, less than 2% by mass, less than 1% by mass, less than 0.9% by mass, less than 0.5% by mass, less than 0.3% by mass, less than 0.1% by mass, less than 0.05% by mass, less than 0.01% by mass, and 0% by mass.

<Method for Preparing Component (A)>

The component (A) may be synthesized by various known polymerization methods, preferably a radical polymerization method. Specifically, it is preferable to add a radical polymerization initiator and, if necessary, a chain transfer agent, to a monomer mixture containing the aforementioned components, and, while stirring the mixture, perform a polymerization reaction at a reaction temperature of 50° C. to 100° C. The reaction time is not particularly limited and is preferably 1 hour to 10 hours.

As the radical polymerization initiator, various known ones may be used without particular limitation. Examples of the radical polymerization initiator include: a persulfate, such as potassium persulfate and ammonium persulfate or the like; a redox polymerization initiator in which the above persulfate and a reductant such as sodium bisulfite or the like are combined; and an azo initiator, such as 2,2'-azobis-2-amidinopropane dihydrochloride or the like. The amount of the radical polymerization initiator used is not particularly limited, and is preferably 0.05% by mass to 5.0% by mass, more preferably 0.1% by mass to 3.0% by mass, with respect to 100% by mass of the monomer group that provides the component (A).

Before the radical polymerization reaction and/or when the obtained component (A) is dissolved in water, for the purpose of improving production stability, the pH of a reaction solution may be adjusted by a general neutralizer such as ammonia or organic amine, potassium hydroxide, sodium hydroxide, lithium hydroxide or the like. In this case, the pH is preferably 2 to 11. For the same purpose, it is also possible to use ethylene diamine tetraacetic acid (EDTA), which is a metal ion sealant, or a salt thereof, or the like.

<Physical Properties of Component (A)>

The upper limit and lower limit of a glass transition temperature of the component (A) are, for example, 160° C., 155° C., 150° C., 145° C., 140° C., 135° C., 130° C., 125° C., 120° C., 115° C., 110° C., 105° C., 100° C., 95° C., 90° C., 85° C., 80° C., 75° C., 70° C., 65° C., 60° C., 55° C., 50° C., 45° C., 40° C., 35° C., 30° C., 25° C., 20° C., 15° C., 10° C., 5° C., and 0° C. In one embodiment, 0° C. or higher is preferable, and 30° C. or higher is more preferable from the viewpoints of mechanical strength and heat resistance.

The glass transition temperature of the component (A) may be adjusted by a combination of monomers. The glass transition temperature of the component (A) can be calculated from glass transition temperatures (Tg) (absolute temperature: K) of homopolymers of the monomers and mass fractions thereof based on the Fox equation shown below.

$$1/Tg = (W_1/Tg_1) + (W_2/Tg_2) + (W_3/Tg_3) + \ldots + (W_n/Tg_n)$$

[In the equation, Tg indicates the glass transition temperature (K) of the polymer to be calculated, $W_1$ to $W_n$ each indicate a mass fraction of each monomer, and $Tg_1$ to $Tg_n$ each indicate the glass transition temperature (K) of a homopolymer of each monomer.]

For example, the glass transition temperature is 165° C. in the case of a homopolymer of acrylamide, is 106° C. in the case of a homopolymer of acrylic acid, is −15° C. in the case of a homopolymer of hydroxyethyl acrylate, and is 105° C. in the case of a homopolymer of acrylonitrile. In order to obtain the component (A) having a desired glass transition temperature, the monomer composition constituting the component (A) can be determined. Moreover, the glass transition temperature of a homopolymer of a monomer can be measured by a differential scanning calorimeter (DSC), a differential thermal analyzer (DTA), a thermomechanical measurement apparatus (TMA) or the like under the condition that the temperature is raised from −100° C. to 300° C. (at a temperature rising rate of 10° C./min). Moreover, values described in a literature may also be used. Examples of the literature include page 325 of "Handbook of Chemistry: Pure Chemistry II" (Revised 5th Edition) edited by the Chemical Society of Japan.

A weight average molecular weight (Mw) of the component (A) is not particularly limited, and its upper limit and lower limit are, for example, 7,000,000, 6,500,000, 6,000,000, 5,500,000, 5,000,000, 4,500,000, 4,000,000, 3,500,000, 3,000,000, 2,500,000, 2,000,000, 1,500,000, 1,000,000, 950,000, 900,000, 850,000, 800,000, 750,000, 700,000, 650,000, 600,000, 550,000, 500,000, 450,000, 400,000, 350,000, 300,000, 250,000, 200,000, 150,000, and 100,000. In one embodiment, from the viewpoint of dispersion stability of the above slurry, 100,000 to 7,000,000 is preferable, and 350,000 to 6,000,000 is more preferable.

A number average molecular weight (Mn) of the component (A) is not particularly limited, and its upper limit and lower limit are, for example, 6,000,000, 5,500,000, 5,000,000, 4,500,000, 4,000,000, 3,500,000, 3,000,000, 2,500,000, 2,000,000, 1,500,000, 1,000,000, 950,000, 900,000, 850,000, 800,000, 750,000, 700,000, 650,000, 600,000, 550,000, 500,000, 450,000, 400,000, 300,000, 200,000, 100,000, 50,000, and 10,000. In one embodiment, the number average molecular weight (Mn) of the component (A) is preferably 10,000 or more.

The weight average molecular weight and the number average molecular weight may be calculated, for example, as values in terms of polyacrylic acid as measured by gel permeation chromatography (GPC) in an appropriate solvent.

The upper limit and lower limit of a molecular weight distribution (Mw/Mn) of the component (A) are, for example, 15, 14, 13, 11, 10, 9, 7.5, 5, 4, 3, 2.9, 2.5, 2, 1.5, and 1.1. In one embodiment, the molecular weight distribution (Mw/Mn) of the component (A) is preferably 1.1 to 15.

B-type viscosity of an aqueous solution containing 13% by mass of the component (A) is not particularly limited, and its upper limit and lower limit are, for example, 100,000 mPa·s, 90,000 mPa·s, 80,000 mPa·s, 70,000 mPa·s, 60,000 mPa·s, 50,000 mPa·s, 45,000 mPa·s, 40,000 mPa·s, 30,000 mPa·s, 20,000 mPa·s, 10,000 mPa·s, 9,000 mPa·s, 8,000 mPa·s, 7,000 mPa·s, 6,000 mPa·s, 5,000 mPa·s, 4,000 mPa·s, 3,000 mPa·s, 2,000 mPa·s, 1,000 mPa·s, 900 mPa·s, 700 mPa·s, 500 mPa·s, 300 mPa·s, 200 mPa·s, and 100 mPa·s. In one embodiment, the above B-type viscosity preferably ranges from 100 mPa·s to 100,000 mPa·s.

The B-type viscosity is measured by a B-type viscometer such as "B-type Viscometer Model BM" (product name) made by Toki Sangyo Co., Ltd.

The upper limit and lower limit of the content of the component (A) with respect to 100% by mass of the binder aqueous solution for a lithium-ion battery are, for example, 20% by mass, 19% by mass, 15% by mass, 14% by mass, 12% by mass, 10% by mass, 9% by mass, 7% by mass, 6% by mass, and 5% by mass. In one embodiment, the above content is preferably 5% by mass to 20% by mass.

<Amino Group-containing Water-soluble Polymer (B), 1% by Mass Aqueous Solution Thereof Having pH of 9 or Higher: Also Referred to as Component (B)>

The component (B) may be used singly or in combination of two or more kinds thereof.

The upper limit and lower limit of the pH of a 1% by mass aqueous solution of the amino group-containing water-soluble polymer (B) are, for example, 14, 13.5, 13, 12.5, 12, 11.5, 11.4, 11.3, 11, 10.8, 10.5, 10, 9.5, and 9. In one embodiment, the above pH is preferably 9 or higher.

The pH of a 1% by mass aqueous solution of the amino group-containing water-soluble polymer (B) is measured, for example, as follows.

An amino group-containing water-soluble polymer (B) aqueous solution is diluted with ion-exchanged water to the amount of 1% by mass, and its pH is measured at 25° C. using an appropriate glass electrode pH meter (for example, "Handy pH Meter D-52" (product name) made by Horiba, Ltd.).

The amino group of the component (B) means —$NR^{aa}R^{ab}$ (wherein $R^{aa}$ and $R^{ab}$ are each independently a hydrogen atom or an alkyl group; moreover, —$NR^{aa}R^{ab}$ is not the $NR^{aa}R^{ab}$ that constitutes an amide group (—$CONR^{aa}R^{ab}$)). In one embodiment, the amino group of the component (B) is preferably —$NH_2$.

Example of the amino group-containing water-soluble polymer include: polyallylamine, polyethyleneimine; a polyethyleneimine derivative, such as poly(N-hydroxyethyleneimine), carboxymethylated polyethyleneimine sodium salt or the like; polypropyleneimine; a polypropylenimine derivative, such as poly(N-2-dihydroxylpropyleneimine) or the like; an aminoethylated acrylic polymer obtained by aminoethylation of an acrylic acid polymer; and a cationized cellulose obtained by modification of a cellulose derivative (such as hydroxyethyl cellulose, carboxymethyl cellulose or the like) with a cationization agent having a substituted or unsubstituted amino group. In one embodiment, the amino group-containing water-soluble polymer (B) is preferably polyallylamine.

<Physical Properties of Component (B)>

The upper limit and lower limit of a molecular weight of the amino group-containing water-soluble polymer (B) are, for example, 50,000, 45,000, 40,000, 35,000, 30,000, 25,000, 20,000, 15,000, 10,000, 9,000, 7,500, 5,000, 2,500, and 1,600. In one embodiment, from the viewpoints of achieving sufficient binder aqueous solution viscosity and preventing insolubilization in water when interacting with the acidic group-containing water-soluble polymer (A), the amino group-containing water-soluble polymer (B) preferably has a molecular weight of 1,600 to 50,000.

In the disclosure, when simply described as "molecular weight," it means either formula weight or number average molecular weight. When a structure of a compound can be uniquely expressed by a specific chemical formula (that is, the molecular weight distribution is 1), the above molecular weight means formula weight. On the other hand, when a structure of a compound cannot be uniquely expressed by a specific chemical formula (that is, the molecular weight distribution is greater than 1), the above molecular weight means number average molecular weight.

The molecular weight of the component (B) may be calculated, for example, as a value in terms of polyethylene oxide as measured by gel permeation chromatography (GPC) in an appropriate solvent.

The upper limit and lower limit of a residue rate upon impregnation of the amino group-containing water-soluble polymer (B) with dimethyl carbonate at 25° C. for 24 hours are, for example, 100% by mass, 99% by mass, 98% by mass, 95% by mass, 90% by mass, 85% by mass, 80% by mass, 75% by mass, 70% by mass, 65% by mass, 60% by mass, 55% by mass, 50% by mass, 45% by mass, 40% by mass, 35% by mass, 30% by mass, 25% by mass, and 20% by mass. In one embodiment, the residue rate upon impregnation of the amino group-containing water-soluble polymer (B) with dimethyl carbonate at 25° C. for 24 hours is preferably 20% by mass or more, more preferably 50% by mass or more.

The residue rate upon impregnation with dimethyl carbonate at 25° C. for 24 hours is measured, for example, as follows.

(1) An amino group-containing water-soluble polymer (B) aqueous solution is dried for 12 hours by a circulating air dryer (product name "DRS420DA" made by ADVANTEC) set to 130° C., and a solid or liquid sample of the amino group-containing water-soluble polymer (B) is obtained.

(2) 1 g of an obtained test piece is weighed in a petri dish, 50 g of dimethyl carbonate is put therein, and the resultant is left to stand at 25° C. for 24 hours.

(3) After that, the supernatant amino group-containing water-soluble polymer (B) is removed, and the residue is dried for 1 hour by a circulating air dryer (product name "DRS420DA" made by ADVANTEC) set to 130° C., and the mass thereof is measured.

(4) The residue rate upon impregnation with dimethyl carbonate at 25° C. for 24 hours is calculated by the following equation:

Residue rate upon impregnation with dimethyl carbonate at 25° C. for 24 hours={(mass after impregnation with dimethyl carbonate and drying)/(mass before impregnation with dimethyl carbonate)}×100(%)

The upper limit and lower limit of an amine value of the amino group-containing water-soluble polymer (B) are, for example, 24 mmol/g, 23.5 mmol/g, 23.2 mmol/g, 23 mmol/g, 22 mmol/g, 20 mmol/g, 19 mmol/g, 18 mmol/g, 17.5 mmol/g, 17 mmol/g, 15 mmol/g, 13 mmol/g, 11 mmol/g, and 10 mmol/g. The above amine value is preferably 10 mmol/g to 24 mmol/g.

The amine value is calculated as follows.

(1) When Constituent Monomers of Amino Group-Containing Water-Soluble Polymer (B) are Known When A mol % of a monomer A (having a molecular weight $M_A$) and B mol % of a monomer B (having a molecular weight $M_B$) are used, the amine value is calculated by the following equation:

Amine value=1000/[[$M_A$×(A/100)]+[$M_B$×(B/100)]]

(2) When Constituent Monomers of Amino Group-Containing Water-Soluble Polymer (B) Are Unknown A value of mgKOH/g obtained in accordance with a potentiometric titration method described in JIS K7237 (1995) is converted into mmol/g, and the amine value may be calculated as the amount per 1 g of solid content of the amino group-containing water-soluble polymer (B).

Since the component (B) is water-soluble, it is capable of interacting with the component (A), which is also water-soluble.

The upper limit and lower limit of the content of the component (B) with respect to 100% by mass of the binder aqueous solution for a lithium-ion battery are, for example, 3% by mass, 2.9% by mass, 2.7% by mass, 2.5% by mass, 2.3% by mass, 2% by mass, 1.9% by mass, 1.7% by mass, 1.5% by mass, 1.3% by mass, 1% by mass, 0.9% by mass, 0.7% by mass, 0.5% by mass, 0.3% by mass, 0.1% by mass, 0.09% by mass, 0.07% by mass, and 0.05% by mass. In one embodiment, the above content is preferably 0.05% by mass to 3% by mass.

The upper limit and lower limit of a mass ratio of the component (A) and the component (B) contained in the binder aqueous solution for a lithium-ion battery are, for example, 400, 375, 350, 325, 300, 275, 250, 225, 200, 199, 195, 190, 180, 175, 150, 125, 100, 99, 95, 90, 85, 80, 75, 70, 66, 65, 60, 55, 50, 49, 45, 40, 35, 33, 32, 30, 25, 10, 5, 2, and 1.6. In one embodiment, the above mass ratio is preferably 1.6 to 400.

The upper limit and lower limit of an acidic group to amino group molar ratio of an acidic group contained in the acidic group-containing water-soluble polymer (A) to an amino group contained in the amino group-containing water-soluble polymer (B) are, for example, 15, 14, 13, 12, 11, 10, 9, 8, 7, 6, 5, 4, 3, 2, and 1. In one embodiment, the above molar ratio is preferably 1 to 15.

<Water>

Examples of water include ultrapure water, pure water, distilled water, ion-exchanged water, and tap water.

The upper limit and lower limit of the content of the water with respect to 100% by mass of the binder aqueous solution for a lithium-ion battery are, for example, 95% by mass, 90% by mass, 85% by mass, and 80% by mass. In one embodiment, the content of the water with respect to 100% by mass of the binder aqueous solution for a lithium-ion battery is preferably 80% by mass to 95% by mass.

The upper limit and lower limit of a mass ratio [component (A)/water] between the component (A) and the water contained in the binder aqueous solution for a lithium-ion battery are, for example, 0.25, 0.2, 0.15, 0.1, and 0.05. In one embodiment, the above mass ratio is preferably 0.05 to 0.25.

The upper limit and lower limit of a mass ratio [component (B)/water] between the component (B) and the water contained in the binder aqueous solution for a lithium-ion battery are, for example, 0.038, 0.03, 0.02, 0.01, 0.009, 0.005, 0.003, 0.001, 0.0009, 0.0007, and 0.0005. In one embodiment, the above mass ratio is preferably 0.0005 to 0.038.

<Dispersion (Emulsion)>

In one embodiment, the above binder aqueous solution for a lithium-ion battery contains a dispersion (emulsion).

Examples of the dispersion (emulsion) include styrene-butadiene-based copolymer latex, polystyrene-based polymer latex, polybutadiene-based polymer latex, acrylonitrile-butadiene-based copolymer latex, polyurethane-based polymer latex, polymethylmethacrylate-based polymer latex, methylmethacrylate-butadiene-based copolymer latex, polyacrylate-based polymer latex, vinyl chloride-based polymer latex, vinyl acetate-based polymer emulsion, vinyl acetate-ethylene-based copolymer emulsion, polyethylene emulsion, carboxy-modified styrene-butadiene copolymer resin emulsion, acrylic resin emulsion, polyethylene, polypropylene, polyethylene terephthalate, polyamide (PA), polyimide (PI), polyamide-imide (PAI), an aromatic polyamide, alginic acid and a salt thereof, polyvinylidene fluoride (PVDF), polytetrafluoroethylene (PTFE), a tetrafluoroethylene-hexafluoropropylene copolymer (FEP), a tetrafluoroethylene-perfluoroalkyl vinyl ether copolymer (PFA), and an ethylene tetrafluoroethylene (ETFE) copolymer.

The upper limit and lower limit of the content of the dispersion (emulsion) with respect to 100% by mass of the component (A) are, for example, 50% by mass, 45% by mass, 40% by mass, 35% by mass, 30% by mass, 25% by mass, 20% by mass, 19% by mass, 17% by mass, 15% by mass, 13% by mass, 10% by mass, 9% by mass, 7% by mass, 5% by mass, 4% by mass, 2% by mass, 1% by mass, and 0% by mass. In one embodiment, the above content is preferably 0% by mass to 50% by mass from the viewpoints of springback resistance and discharge capacity retention rate.

<Polyvinylpyrrolidone>

In one embodiment, the above binder aqueous solution for a lithium-ion battery contains polyvinylpyrrolidone.

The upper limit and lower limit of the content of polyvinylpyrrolidone with respect to 100% by mass of the component (A) are, for example, 10% by mass, 9% by mass, 7% by mass, 5% by mass, 4% by mass, 2% by mass, 1% by mass, and 0% by mass. In one embodiment, the above content is preferably 0% by mass to 10% by mass from the viewpoint of suppressing rheological changes in the slurry.

<Additive>

The binder aqueous solution for a lithium-ion battery may contain, as an additive, a component that does not correspond to any of the component (A), the component (B), water, and the dispersion (emulsion).

Examples of the additive include a dispersant, a leveling agent, an antioxidant, and a thickener.

The content of the additive is, for example, less than 5% by mass, less than 4% by mass, less than 2% by mass, less than 1% by mass, less than 0.9% by mass, less than 0.5% by mass, less than 0.4% by mass, less than 0.2% by mass, less than 0.1% by mass, less than 0.09% by mass, less than 0.05% by mass, less than 0.04% by mass, less than 0.02% by mass, less than 0.01% by mass, and 0% by mass, with respect to 100% by mass of the component (A) or the component (B).

In addition, the content of the additive with respect to 100% by mass of the above aqueous solution is, for example, less than 5% by mass, less than 4% by mass, less than 2% by mass, less than 1% by mass, less than 0.9% by mass, less than 0.5% by mass, less than 0.4% by mass, less than 0.2% by mass, less than 0.1% by mass, less than 0.09% by mass, less than 0.05% by mass, less than 0.04% by mass, less than 0.02% by mass, less than 0.01% by mass, and 0% by mass.

Examples of the dispersant include an anionic dispersant, a cationic dispersant, a nonionic dispersant, and a polymer dispersant.

Examples of the leveling agent include a surfactant, such as an alkyl-based surfactant, a silicon-based surfactant, a fluorine-based surfactant, and a metal-based surfactant or the like. By using the surfactant, cissing that occurs during coating may be prevented and smoothness of the above slurry layer (coating layer) may be improved.

Examples of the antioxidant include a phenol compound, a hydroquinone compound, an organophosphorus compound, a sulfur compound, a phenylenediamine compound, and a polymer type phenol compound. The polymer type phenol compound is a polymer having a phenol structure in a molecule. A weight average molecular weight of the polymer type phenol compound is preferably 200 to 1,000, more preferably 600 to 700.

Examples of the thickener include: a cellulosic polymer, such as carboxymethyl cellulose, methyl cellulose, hydroxypropyl cellulose or the like, as well as an ammonium salt and an alkali metal salt thereof; (modified) poly(meth)acrylic acid as well as an ammonium salt and an alkali metal salt thereof; polyvinyl alcohols, such as (modified) polyvinyl alcohol, a copolymer of acrylic acid or acrylate and vinyl alcohol, a copolymer of maleic anhydride, maleic acid, or fumaric acid and vinyl alcohol; polyethylene glycol, polyethylene oxide, modified polyacrylic acid, oxidized starch, phosphoric acid starch, casein, various modified starches, and an acrylonitrile-butadiene copolymer hydride.

The upper limit and lower limit of the B-type viscosity of the binder aqueous solution for a lithium-ion battery containing the component (A) and the component (B) in a total amount of 1.5% by mass are, for example, 100,000 mPa·s, 90,000 mPa·s, 80,000 mPa·s, 70,000 mPa·s, 60,000 mPa·s, 50,000 mPa·s, 40,000 mPa·s, 30,000 mPa·s, 25,000 mPa·s, 22,000 mPa·s, 20,000 mPa·s, 19,000 mPa·s, 16,000 mPa·s, 15,000 mPa·s, 10,000 mPa·s, 9,500 mPa·s, 9,300 mPa·s, 9,000 mPa·s, 8,000 mPa·s, 7,000 mPa·s, 6,900 mPa·s, 6,500 mPa·s, 6,000 mPa·s, 5,700 mPa·s, 5,500 mPa·s, 5,000 mPa·s, 4,500 mPa·s, 4,000 mPa·s, 3,000 mPa·s, 2,000 mPa·s, 1,000 mPa·s, 900 mPa·s, 800 mPa·s, 700 mPa·s, and 500 mPa·s. In one embodiment, from the viewpoint of improving dispersion stability of slurry and electrode adhesion, the above B-type viscosity is preferably 500 mPa·s to 100,000 mPa·s, more preferably 800 mPa·s to 80,000 mPa·s, and even more preferably 1,000 mPa·s to 50,000 mPa·s.

The upper limit and lower limit of the pH of the binder aqueous solution for a lithium-ion battery are, for example, 9, 8.9, 8.5, 8, 7.9, 7.5, 7, 6.9, 6.5, 6, 5.9, 5.6, 5.5, 5.4, 5.2, 5.1, 5, and 4. In one embodiment, the pH of the binder aqueous solution for a lithium-ion battery is preferably 4 to 9 and more preferably 4 to 7 from the viewpoint of solution stability.

The pH is measured at 25° C. using a glass electrode pH meter (for example, "Handy pH Meter D-52" (product name) made by Horiba, Ltd.).

The binder aqueous solution for a lithium-ion battery may be used as a binder aqueous solution for a lithium-ion battery electrode, a binder aqueous solution for a lithium-ion battery negative electrode, or a thickener for a lithium-ion battery.

[Slurry for Lithium-Ion Battery Negative Electrode: Also Referred to as Slurry]

The disclosure provides a slurry for a lithium-ion battery negative electrode, the slurry containing the above binder aqueous solution for a lithium-ion battery and a negative electrode active material (C).

In the disclosure, "slurry" means a suspension of liquid and solid particles.

The upper limit and lower limit of the content of the component (A) with respect to 100% by mass of the above slurry are, for example, 99.9% by mass, 95% by mass, 90% by mass, 85% by mass, 80% by mass, 75% by mass, 70% by mass, 65% by mass, 60% by mass, 55% by mass, 50% by mass, 45% by mass, 40% by mass, 35% by mass, 30% by mass, 25% by mass, 20% by mass, 15% by mass, 10% by mass, 5% by mass, 4% by mass, 2% by mass, 1% by mass, 0.9% by mass, 0.5% by mass, 0.2% by mass, and 0.1% by mass. In one embodiment, the above content is preferably 0.1% by mass to 99% by mass.

The upper limit and lower limit of the content of the component (B) with respect to 100% by mass of the above slurry are, for example, 1% by mass, 0.9% by mass, 0.7% by mass, 0.5% by mass, 0.3% by mass, 0.2% by mass, 0.1% by mass, 0.09% by mass, 0.07% by mass, 0.05% by mass, 0.03% by mass, 0.01% by mass, 0.009% by mass, 0.007% by mass, 0.005% by mass, 0.003% by mass, 0.002% by mass, and 0.001% by mass. In one embodiment, the above content is preferably 0.001% by mass to 1% by mass.

The upper limit and lower limit of the content of water with respect to 100% by mass of the above slurry are, for example, 70% by mass, 65% by mass, 60% by mass, 55% by mass, 50% by mass, 45% by mass, 40% by mass, 35% by mass, and 30% by mass. In one embodiment, the above content is preferably 30% by mass to 70% by mass.

<Negative Electrode Active Material (C): Also Referred to as Component (C)>

A negative electrode active material may be used singly or in combination of two or more kinds thereof.

The negative electrode active material is not particularly limited as long as being capable of reversibly occluding and releasing lithium, and an appropriate material may be suitably selected depending on the type of the target lithium-ion battery. Examples of the negative electrode active material include a carbon material, as well as a material alloyable with lithium, such as a silicon material, a lithium atom-containing oxide, a lead compound, a tin compound, an arsenic compound, an antimony compound, and an aluminum compound or the like.

Examples of the above carbon material include graphite (for example, natural graphite, artificial graphite or the like) which is highly crystalline carbon, low crystalline carbon (such as soft carbon, hard carbon or the like), carbon black (such as Ketjen black, acetylene black, channel black, lamp black, oil furnace black, thermal black or the like), a fullerene, a carbon nanotube, a carbon nanofiber, a carbon nanohorn, a carbon fibril, mesocarbon microbeads (MCMB), and a pitch-based carbon fiber.

Examples of the above silicon material include, in addition to silicon, silicon oxide and silicon alloy, silicon oxide composites expressed by SiC, $SiO_xC_y$ (wherein $0<x\leq3$, and $0<y\leq5$), $Si_3N_4$, $Si_2N_2O$, and $SiO_x$ (wherein $0<x\leq2$) (for example, materials described in Japanese Patent Laid-Open Nos. 2004-185810 and 2005-259697), and a silicon material described in Japanese Patent Laid-Open No. 2004-185810. In addition, silicon materials described in Japanese Patent Nos. 5390336 and 5903761 may also be used.

The above silicon oxide is preferably a silicon oxide expressed by a composition formula $SiO_x$ (wherein $0<x\leq2$, preferably $0.1\leq x\leq1$).

The above silicon alloy is preferably an alloy of silicon and at least one transition metal selected from the group consisting of titanium, zirconium, nickel, copper, iron and molybdenum. Silicon alloys of these transition metals are preferable due to high electronic conductivity and high strength. The silicon alloy is more preferably a silicon-nickel alloy or a silicon-titanium alloy, particularly preferably a silicon-titanium alloy. A content ratio of silicon in the silicon alloy is preferably 10 mol % or more, more preferably 20 mol % to 70 mol %, with respect to 100 mol % of metal elements in the above silicon alloy. The silicon material may be single crystalline, polycrystalline, or amorphous.

When the silicon material is used as the negative electrode active material, a negative electrode active material other than the silicon material may be used together. Examples of such a negative electrode active material include the above carbon material; a conductive polymer such as polyacene or the like; a composite metal oxide expressed by $A_xB_yO_Z$ (wherein A represents an alkali metal or a transition metal, B represents at least one selected from transition metals such as cobalt, nickel, aluminum, tin, manganese or the like, 0 represents an oxygen atom, and X, Y, and Z are respectively numbers in the following ranges: $0.05<X<1.10$, $0.85<Y<4.00$ and $1.5<Z<5.00$), or other metal oxide. When the silicon material is used as the negative electrode active material, it is preferable to use a carbon material together because a volume change associated with the occlusion and release of lithium is small.

Examples of the above lithium atom-containing oxide include a ternary nickel cobalt lithium manganate, and a lithium-transition metal composite oxide, such as a lithium-manganese composite oxide (such as $LiMn_2O_4$ or the like), a lithium-nickel composite oxide (such as $LiNiO_2$ or the like), a lithium-cobalt composite oxide (such as $LiCoO_2$ or the like), a lithium-iron composite oxide (such as $LiFeO_2$ or the like), a lithium-nickel-manganese composite oxide (such as $LiNi_{0.5}Mn_{0.5}O_2$ or the like), a lithium-nickel-cobalt composite oxide (such as $LiNi_{0.8}Co_{0.2}O_2$ or the like), a lithium-transition metal phosphate compound (such as $LiFePO_4$ or the like), a lithium-transition metal sulfate compound (such as $Li_xFe_2(SO_4)_3$), a lithium-titanium composite oxide (such as lithium titanate: $Li_4Ti_5O_{12}$) or the like, and other conventionally known negative electrode active material.

From the viewpoint of remarkably exhibiting the effect of the disclosure, the carbon material and/or the material alloyable with lithium is preferably contained in the negative electrode active material in an amount of 50% by mass or more, more preferably 80% by mass or more, even more preferably 90% by mass or more, and particularly preferably 100% by mass.

In one embodiment, a negative electrode active material is preferable in which the negative electrode active material (C) contains 1% by mass or more (for example, 2% by mass or more, 5% by mass or more, 10% by mass or more, 25% by mass or more, 50% by mass or more, 75% by mass or more, 90% by mass or more, or 100% by mass) of silicon and/or a silicon oxide covered with a carbon layer.

The shape of the negative electrode active material is not particularly limited and may be an arbitrary shape such as a fine particle shape, a thin film shape or the like, and a fine particle shape is preferable. An average particle diameter of the negative electrode active material is not particularly limited, and its upper limit and lower limit are, for example, 50 μm, 45 μm, 40 μm, 35 μm, 30 μm, 25 μm, 20 μm, 15 μm, 10 μm, 5 μm, 4 μm, 3 μm, 2.9 μm, 2 μm, 1 μm, 0.5 μm, and 0.1 μm. In one embodiment, from the viewpoint of forming a uniform and thin coating film, more specifically, for the reason that handleability is good if the average particle diameter is 0.1 μm or more and application of an electrode is easy if the average particle diameter is 50 μm or less, the average particle diameter of the negative electrode active material is preferably 0.1 μm to 50 μm, more preferably 0.1 μm to 45 μm, even more preferably 1 μm to 10 μm, and particularly preferably 5 μm.

In the disclosure, "particle diameter" means a maximum distance among distances between arbitrary two points on a contour line of a particle (the same applies hereinafter). In addition, in the disclosure, unless otherwise specified, "average particle diameter" means a value calculated as an average value of particle diameters of particles observed in several to several tens of visual fields using an observation means such as a scanning electron microscope (SEM) or a transmission electron microscope (TEM) or the like (the same applies hereinafter).

The upper limit and lower limit of the content of the component (A) with respect to 100% by mass of the negative electrode active material (C) in the above slurry are, for example, 15% by mass, 14% by mass, 13% by mass, 12% by mass, 11% by mass, 10% by mass, 9% by mass, 8% by mass, 7% by mass, 6% by mass, 5% by mass, 4% by mass, 3% by mass, 2% by mass, 1.5% by mass, 1% by mass, and 0.5 mass %. In one embodiment, the above content is preferably 0.5% by mass to 15% by mass.

<Conductive Aid>

In one embodiment, a conductive aid may be contained in the above slurry. Examples of the conductive aid include fibrous carbon such as vapor grown carbon fiber (VGCF), a carbon nanotube (CNT), carbon nanofiber (CNF) or the like, carbon black such as graphite particles, acetylene black, Ketjen black, furnace black or the like, and fine powders of Cu, Ni, Al, Si or alloys thereof having an average particle diameter of 10 μm or less. The content of the conductive aid is not particularly limited, and is preferably 0% by mass to 10% by mass, more preferably 0.5% by mass to 6% by mass, with respect to the negative electrode active material component.

<Slurry Viscosity Adjustment Solvent>

A slurry viscosity adjustment solvent is not particularly limited, and may include a non-aqueous medium having a normal boiling point of 80° C. to 350° C. The slurry viscosity adjustment solvent may be used singly or in combination of two or more kinds thereof. Examples of the slurry viscosity adjustment solvent include: an amide solvent, such as N-methylpyrrolidone, dimethylformamide, N,N-dimethylacetamide or the like; a hydrocarbon solvent, such as toluene, xylene, n-dodecane, tetralin or the like; an alcohol solvent, such as methanol, ethanol, 2-propanol, isopropyl alcohol, 2-ethyl-1-hexanol, 1-nonanol, lauryl alcohol or the like; a ketone solvent, such as acetone, methyl ethyl ketone, cyclohexanone, phorone, acetophenone, isophorone or the like; an ether solvent, such as dioxane, tetrahydrofuran (THF) or the like; an ester solvent, such as benzyl acetate, isopentyl butyrate, methyl lactate, ethyl lactate, butyl lactate or the like; an amine solvent, such as o-toluidine, m-toluidine, p-toluidine or the like; a lactone, such as γ-butyrolactone, δ-butyrolactone or the like; a sulfoxide and sulfone solvent, such as dimethyl sulfoxide, sulfolane or the like; and water. Among them, N-methylpyrrolidone is preferable from the viewpoint of application workability. The content of the above non-aqueous medium is not particularly limited, and is preferably 0% by mass to 10% by mass with respect to 100% by mass of the above slurry.

The above slurry may contain, as an additive, a component that does not correspond to any of the component (A), the component (B), the component (C), water, the conductive aid, and the slurry viscosity adjustment solvent without impairing the effect of the disclosure. Examples of the additive include those described above.

The content of the additive is, for example, less than 5% by mass, less than 4% by mass, less than 2% by mass, less than 1% by mass, less than 0.9% by mass, less than 0.5% by mass, less than 0.4% by mass, less than 0.2% by mass, less than 0.1% by mass, less than 0.09% by mass, less than 0.05% by mass, less than 0.04% by mass, less than 0.02% by mass, less than 0.01% by mass, and 0% by mass, with respect to 100% by mass of any one of the components (A) to (C).

Moreover, the dispersion (emulsion) may be contained in a larger amount than the above additive content. The upper limit and lower limit of the content of the dispersion (emulsion) with respect to 100% by mass of the slurry for a lithium-ion battery negative electrode are, for example, 20% by mass, 19% by mass, 17% by mass, 15% by mass, 13% by mass, 10% by mass, 9% by mass, 7% by mass, 5% by mass, 4% by mass, 2% by mass, 1% by mass, and 0% by mass. In one embodiment, from the viewpoints of springback resistance and discharge capacity retention rate, the amount of the dispersion (emulsion) added with respect to 100% by mass of the above aqueous solution or the above slurry for a lithium-ion battery negative electrode is preferably less than 5% by mass.

The above slurry is prepared by mixing the component (A), the component (B), the component (C), water, and if necessary, the conductive aid and the slurry viscosity adjustment solvent.

Examples of a means of mixing the slurry include a ball mill, a sand mill, a pigment disperser, a Raikai mixer, an ultrasonic disperser, a homogenizer, a planetary mixer, and a Hobart mixer.

[Lithium-Ion Battery Negative Electrode]

The disclosure provides a negative electrode for a lithium-ion battery, obtained by applying the above slurry for a lithium-ion battery negative electrode to a current collector, and drying and curing the slurry. The above lithium-ion battery negative electrode has a cured product of the above slurry for a lithium-ion battery negative electrode on a surface of the current collector.

As the current collector, various known ones may be used without particular limitation. A material of the current collector is not particularly limited, and examples thereof include a metal material, such as copper, iron, aluminum, nickel, stainless steel, nickel-plated steel or the like, or a carbon material, such as carbon cloth, carbon paper or the like. The form of the current collector is not particularly limited. In the case of metal material, examples thereof include a metal foil, a metal cylinder, a metal coil, and a metal plate; in the case of carbon material, examples thereof include a carbon plate, a carbon thin film, and a carbon cylinder. Among them, when an electrode active material is used in the negative electrode, a copper foil is preferably used as the current collector because it is currently used in industrialized products.

The application means is not particularly limited, and examples thereof include a conventionally known coating device, such as a comma coater, a gravure coater, a micro gravure coater, a die coater, and a bar coater.

The drying means is also not particularly limited, and the temperature is preferably 60° C. to 200° C., more preferably 100° C. to 195° C. The atmosphere may be dry air or an inert atmosphere.

The thickness of the negative electrode (cured product) is not particularly limited, and is preferably 5 μm to 300 μm, more preferably 10 μm to 250 μm. By setting the above range, a function of occluding and releasing sufficient lithium with respect to a high-density current value may be easily obtained.

[Lithium-Ion Battery]

The disclosure provides a lithium-ion battery including the above negative electrode for a lithium-ion battery. In one embodiment, the above battery includes an electrolyte solution, a separator, a positive electrode and so on. The above are not particularly limited.

Examples of the electrolyte solution include non-aqueous electrolytic solution in which a supporting electrolyte is dissolved in a non-aqueous solvent. In addition, a film forming agent may be contained in the above non-aqueous electrolytic solution.

As the non-aqueous solvent, various known ones may be used without particular limitation, and may be used singly or in combination of two or more thereof. Examples of the non-aqueous solvent include: a chain carbonate solvent, such as diethyl carbonate, dimethyl carbonate, ethyl methyl carbonate or the like; a cyclic carbonate solvent, such as ethylene carbonate, propylene carbonate, butylene carbonate or the like; a chain ether solvent, such as 1,2-dimethoxyethane or the like; a cyclic ether solvent, such as tetrahydrofuran, 2-methyltetrahydrofuran, sulfolane, 1,3-dioxolane or the like; a chain ester solvent, such as methyl formate, methyl acetate, methyl propionate or the like; a cyclic ester solvent, such as γ-butyrolactone, γ-valerolactone or the like; and acetonitrile. Among them, a combination of mixed solvents containing a cyclic carbonate and a chain carbonate is preferable.

A lithium salt is used as the supporting electrolyte. As the lithium salt, various known ones may be used without particular limitation, and may be used singly or in combination of two or more thereof. Examples of the supporting electrolyte include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Among them, $LiPF_6$, $LiClO_4$ and $CF_3SO_3Li$, which are easily dissolved in a solvent and exhibit a high dissociation degree, are preferable. The higher the dissociation degree of the supporting electrolyte, the higher the lithium-ion conductivity. Therefore, the lithium-ion conductivity can be adjusted according to the type of the supporting electrolyte.

As the film forming agent, various known ones may be used without particular limitation, and may be used singly or in combination of two or more thereof. Examples of the film forming agent include: a carbonate compound, such as vinylene carbonate, vinyl ethylene carbonate, vinyl ethyl carbonate, methylphenyl carbonate, fluoroethylene carbonate, difluoroethylene carbonate or the like; an alkene sulfide, such as ethylene sulfide, propylene sulfide or the like; a sultone compound, such as 1,3-propane sultone, 1,4-butane sultone or the like; and an acid anhydride, such as maleic anhydride, succinic anhydride or the like. The content of the film forming agent in the electrolyte solution is not particularly limited, and is 10% by mass or less, 8% by mass or less, 5% by mass or less, or 2% by mass or less, in order of preference. By setting the content to 10% by mass or less, the advantages of the film forming agent, such as suppression of initial irreversible capacity or improvement in low temperature characteristics and rate characteristics, may be easily achieved.

The separator is an article interposed between a positive electrode and a negative electrode, and is used to prevent a short circuit between the electrodes. Specifically, a porous separator such as a porous film or a nonwoven fabric or the like may be preferably used, which is impregnated with the aforementioned non-aqueous electrolytic solution for use. As a material of the separator, a polyolefin such as polyethylene, polypropylene or the like, or polyethersulfone or the like is used, and polyolefin is preferable.

As the positive electrode, various known ones may be used without particular limitation. Examples of the positive electrode include one obtained by preparing a slurry by mixing a positive electrode active material, a conductive aid, and a binder for a positive electrode with an organic solvent, applying the prepared slurry to a positive electrode current collector and drying and pressing.

Examples of the positive electrode active material include an inorganic positive electrode active material and an organic positive electrode active material. Examples of the inorganic positive electrode active material include a transition metal oxide, a composite oxide of lithium and a transition metal, and a transition metal sulfide. Examples of the above transition metal include Fe, Co, Ni, Mn, and Al. Examples of the inorganic compound used in the positive electrode active material include: a lithium-containing composite metal oxide, such as $LiCoO_2$, $LiNiO_2$, $LiMnO_2$, $LiMn_2O_4$, $LiFePO_4$, $LiNi_{1/2}Mn_{3/2}O_4$, $LiCo_{1/3}Ni_{1/3}Mn_{1/3}O_2$, $Li[Li_{0.1}Al_{0.1}Mn_{1.8}]O_4$, $LiFeVO_4$, or the like; a transition metal sulfide, such as $TiS_2$, $TiS_3$, amorphous $MoS_2$ or the like; and a transition metal oxide, such as $Cu_2V_2O_3$, amorphous $V_2O$—$P_2O_5$, $MoO_3$, $V_2O_5$, $V_6O_{13}$ or the like. These compounds may be partially element-substituted. Examples of the organic positive electrode active material include a conductive polymer, such as polyacetylene, poly-p-phenylene or the like. An iron-based oxide having poor electric conductivity may be used as an electrode active material covered with a carbon material by allowing a carbon source material to exist during reduction firing. These compounds may be partially element-substituted. Among them, from the viewpoints of practicality, electrical characteristics and long life, $LiCoO_2$, $LiNiO_2$, $LiMnO_2$, $LiMn_2O_4$, $LiFePO_4$, $LiNi_{1/2}Mn_{3/2}O_4$, $LiCo_{1/3}Ni_{1/3}Mn_{1/3}O_2$, and $Li[Li_{0.1}Al_{0.1}Mn_{1.8}]O_4$ are preferable.

Examples of the conductive aid include fibrous carbon such as vapor grown carbon fiber (VGCF), a carbon nanotube (CNT), carbon nanofiber (CNF), carbon black such as graphite particles, acetylene black, Ketjen black, furnace black, and fine powders of Cu, Ni, Al, Si or alloys thereof having an average particle diameter of 10 μm or less.

As the binder for a positive electrode, various known ones may be used without particular limitation, and may be used singly or in combination of two or more thereof. Examples of the binder for a positive electrode include a fluorine-based resin (such as polyvinylidene fluoride, polytetrafluoroethylene or the like), a polyolefin (such as polyethylene, polypropylene or the like), a polymer having an unsaturated bond (such as styrene-butadiene rubber, isoprene rubber, butadiene rubber or the like), and an acrylic acid-based polymer (such as an acrylic acid copolymer, a methacrylic acid copolymer or the like).

Examples of the positive electrode current collector include an aluminum foil and a stainless steel foil.

The form of the above lithium-ion battery is not particularly limited. Examples of the form of the lithium-ion battery include a cylinder type in which a sheet electrode and a separator are formed in a spiral shape, a cylinder type having an inside-out structure in which a pellet electrode and a separator are combined, and a coin type in which a pellet electrode and a separator are laminated. In addition, by accommodating the battery of these forms in an arbitrary exterior case, the battery can be used in an arbitrary shape such as a coin shape, a cylindrical shape, a square shape or the like.

A method for producing the above lithium-ion battery is not particularly limited, and the lithium-ion battery may be assembled by an appropriate procedure depending on the structure of the battery. Examples of the method for producing a lithium-ion battery include a method described in Japanese Patent Laid-Open No. 2013-089437. The battery can be produced in the following manner. A negative electrode is placed on an exterior case, an electrolytic solution and a separator are provided thereon, a positive electrode is further placed so as to face the negative electrode, and the positive electrode is fixed with a gasket and a sealing plate.

EXAMPLES

Hereinafter, the disclosure will be specifically described through examples and comparative examples. However, the above description of the preferred embodiments and the following examples are provided for illustration only and not for limiting the disclosure. Therefore, the scope of the disclosure is not limited to the embodiments or examples specifically described herein, but only by the claims. In addition, in each of the examples and comparative examples, unless otherwise specified, numerical values such as part and % are based on mass.

<Acidic Group-Containing Water-Soluble Polymer (A)>

Preparation Example 1

In a reactor equipped with a stirrer, a thermometer, a reflux condenser and a nitrogen gas introduction pipe, 1,800 g of ion-exchanged water, 350 g (2.46 mol) of 50% acrylamide aqueous solution, 148 g (1.64 mol) of 80% acrylic acid aqueous solution, and 0.32 g (0.0021 mol) of sodium methallyl sulfonate were put, and after oxygen in the reaction system was removed through nitrogen gas, the resultant was heated to 55° C. 2.64 g of 2,2'-azobis-2-amidinopropane dihydrochloride (product name "NC-32" made by NIPPOH CHEMICALS CO., LTD.) and 20 g of ion-exchanged water were put therein, and the resultant was heated to 80° C. and reacted for 3 hours. After that, 103 g (1.23 mol) of 48% sodium hydroxide aqueous solution was added as a neutralizer and stirred, and ion-exchanged water was added so as to achieve a solid content concentration of 13%, and an aqueous solution containing the acidic group-containing water-soluble polymer (A) was obtained. The B-type viscosity of this solution at 25° C. was 20,000 mPa·s.

In the preparation examples other than Preparation Example 1, an aqueous solution containing the acidic group-containing water-soluble polymer (A) was prepared in the same manner as in Preparation Example 1, except that the monomer composition was changed to that shown in Table 1.

Comparative Preparation Example 1

In a reactor equipped with a stirrer, a thermometer, a reflux condenser and a nitrogen gas introduction pipe, 1,280 g of ion-exchanged water, 500 g (3.52 mol) of 50% acrylamide aqueous solution, and 0.28 g (0.0018 mol) of sodium methallyl sulfonate were put, and after oxygen in the reaction system was removed through nitrogen gas, the resultant was heated to 55° C. 2.3 g of 2,2'-azobis-2-amidinopropane dihydrochloride (product name "NC-32" made by NIPPOH CHEMICALS CO., LTD.) and 20 g of ion-exchanged water were put therein, and the resultant was heated to 80° C. and reacted for 3 hours. After that, ion-exchanged water was added so as to achieve a solid content concentration of 13%, and a water-soluble polymer aqueous solution was obtained. The B-type viscosity of this solution at 25° C. was 15,000 mPa·s.

In Comparative Preparation Examples 2 to 5, an aqueous solution containing a water-soluble polymer was prepared in the same manner as in Preparation Example 1, except that the monomer composition was changed to that shown in Table 1.

Comparative Preparation Example 6

In a reactor equipped with a stirrer, a thermometer, a reflux condenser and a nitrogen gas introduction pipe, 700 g of ion-exchanged water, 12.7 g (0.14 mol) of 80% acrylic acid aqueous solution, 233 g (1.27 mol) of 2-ethylhexyl acrylate, and 2.4 g of sodium polyoxyethylene alkyl ether sulfate as an emulsifier were put, and after oxygen in the reaction system was removed through nitrogen gas, the resultant was heated to 80° C. 2.4 g of 2,2'-azobis-2-amidinopropane dihydrochloride (product name "NC-32" made by NIPPOH CHEMICALS CO., LTD.) and 20 g of ion-exchanged water were put therein, and the resultant was reacted at 80° C. for 3 hours. After that, ion-exchanged water was added so as to achieve a solid content concentration of 13%, and a polymer aqueous dispersion was obtained.

In Comparative Preparation Examples 7 and 8, a polymer aqueous dispersion was prepared in the same manner as in Comparative Preparation Example 6, except that the monomer composition was changed to that shown in Table 1.

TABLE 1

| | (Meth)acrylamide group-containing compound (a) | | Unsaturated organic acid (b) | Alkali metal or alkaline earth metal salt (c) of unsaturated organic acid | | | Components other than (a) to (c) | | | B-type viscosity [mPa · s] | Weight average molecular weight | Number of moles derived from component (b) per 1 g of component (A) [mmol/g] |
|---|---|---|---|---|---|---|---|---|---|---|---|---|
| | AM mol % | DMAA mol % | AA mol % | AANa mol % | ATBSNa mol % | SMAS mol % | AN mol % | HEA mol % | 2-EHA mol % | | | |
| Preparation Example 1 | 59.95 | — | 10 | 30 | — | 0.05 | — | | — | 20,000 | 850,000 | 1.28 |
| Preparation Example 2 | 55 | 5 | 3 | 17 | — | — | 20 | | — | 10,000 | 600,000 | 0.41 |
| Preparation Example 3 | 89.95 | — | 5 | 5 | — | 0.05 | — | | — | 20,000 | 800,000 | 0.69 |
| Preparation Example 4 | 40 | — | 20 | — | 40 | — | — | | — | 45,000 | 850,000 | 1.49 |
| Preparation Example 5 | 35 | 0 | 3.5 | 31.5 | 0 | 0.1 | 0 | 29.9 | 0 | 5,000 | 700,000 | 0.38 |
| Comparative Preparation Example 1 | 99.95 | — | — | — | — | 0.05 | — | | — | 15,000 | 600,000 | 0.00 |
| Comparative Preparation Example 2 | — | — | 99.95 | — | — | 0.05 | — | | — | 10,000 | 500,000 | 13.85 |
| Comparative Preparation Example 3 | — | — | — | 99.95 | — | 0.05 | — | | — | 13,000 | 550,000 | 0.00 |
| Comparative Preparation Example 4 | — | — | 10 | 89.95 | — | 0.05 | — | | — | 12,000 | 550,000 | 1.09 |
| Comparative Preparation Example 5 | 79.95 | — | — | 20 | — | 0.05 | — | | — | 20,000 | 800,000 | 0.00 |
| Comparative Preparation Example 6 | 79.95 | — | 20 | — | — | 0.05 | — | | — | 18,000 | 800,000 | 2.80 |

TABLE 1-continued

| | (Meth)acrylamide group-containing compound (a) | | Unsaturated organic acid (b) | Alkali metal or alkaline earth metal salt (c) of unsaturated organic acid | | | Components other than (a) to (c) | | | B-type viscosity [mPa · s] | Weight average molecular weight | Number of moles derived from component (b) per 1 g of component (A) [mmol/g] |
|---|---|---|---|---|---|---|---|---|---|---|---|---|
| | AM mol % | DMAA mol % | AA mol % | AANa mol % | ATBSNa mol % | SMAS mol % | AN mol % | HEA mol % | 2-EHA mol % | | | |
| Comparative Preparation Example 7 | — | — | 10 | — | — | — | — | — | 90 | 20 | — | 0.58 |
| Comparative Preparation Example 8 | 40 | — | — | — | — | — | — | — | 60 | 30 | — | 0 |

AM: Acrylamide ("50% Acrylamide" made by Mitsubishi Chemical Corporation)
DMAA: N,N-dimethylacrylamide ("DMAA" made by KJ Chemicals Corporation)
AA: Acrylic acid ("80% Acrylic Acid" made by Osaka Organic Chemical Industry Ltd.)
AANa: Sodium acrylate
ATBSNa: Acrylamide-t-butyl sulfonic acid ("ATBS-Na" made by Toagosei Company, Limited)
SMAS: Sodium methallyl sulfonate
AN: Acrylonitrile ("Acrylonitrile" made by Mitsubishi Chemical Corporation)
HEA: 2-hydroxyethyl acrylate ("HEA" made by Osaka Organic Chemical Industry Ltd.) 2-EHA: 2-ethylhexyl acrylate ("2-Ethylhexyl Acrylate" made by Toagosei Company, Limited)
NaOH: Sodium hydroxide ("48% Sodium Hydroxide Solution" made by Kanto Chemical Co., Inc.)

B-Type Viscosity of Component (A)

The viscosity of each preparation example and comparative preparation example was measured at 25° C. under the following conditions using a B-type viscometer (product name "B-type Viscometer Model BM" made by Toki Sangyo Co., Ltd.).

When the viscosity was 100,000 mPa·s to 20,000 mPa·s: No. 4 rotor was used at a rotational speed of 6 rpm When the viscosity was less than 20,000 mPa·s: No. 3 rotor was used at a rotational speed of 6 rpm Weight Average Molecular Weight The weight average molecular weight was calculated as a value in terms of polyacrylic acid as measured by gel permeation chromatography (GPC) under a 0.2 M phosphate buffer/acetonitrile solution (90/10, PH 8.0). HLC-8220 (made by Tosoh Corporation) was used as a GPC device, and SB-806M-HQ (made by SHODEX) was used as a column.

<Amino Group-Containing Water-Soluble Polymer (B)>
Polyallylamine ("PAA-15C" made by Nittobo Medical Co., Ltd.)
Polyallylamine ("PAA-05" made by Nittobo Medical Co., Ltd.)
Polyallylamine ("PAA-25" made by Nittobo Medical Co., Ltd.)
Polyethyleneimine ("SP-200" made by Nippon Shokubai Co., Ltd.)

Regarding the above component (B), since all the constituent monomers are known, as described in the specification, an amine value (the number of moles derived from the amino group component per 1 g of the component (B)) was calculated from the molecular weight and content of the monomers.

In a reactor equipped with a stirrer, a thermometer, a reflux condenser and a nitrogen gas introduction pipe, 100 g of 15% polyallylamine aqueous solution ("PAA-15C" made by Nittobo Medical Co., Ltd.) was put, 25.8 g of concentrated hydrochloric acid was added and stirred, ion-exchanged water was added so as to achieve a solid content concentration of 15%, and polyallylamine hydrochloride was obtained.

TABLE 2

| Example | Product name | Polymer component | Molecular weight | pH of 1% aqueous solution | Residue rate [%] after impregnation with DMC | Number of moles derived from amino group component per 1 g of component (B) [mmol/g] |
|---|---|---|---|---|---|---|
| 1 | PAA-15C | Polyallylamine | 15,000 | 11.3 | 98 | 17.5 |
| 2 | PAA-05 | Polyallylamine | 5,000 | 11.1 | 98 | 17.5 |
| 3 | PAA-25 | Polyallylamine | 25,000 | 11.4 | 99 | 17.5 |
| 4 | SP-200 | Polyethyleneimine | 10,000 | 10.8 | 20 | 23.2 |
| 5 | Neutralized product of PAA-15C and hydrochloric acid | Polyallylamine hydrochloride | 15,000 | 7.0 | 97 | 10.7 | pH of 1% by Mass Aqueous Solution of Amino Group-Containing Water-Soluble Polymer (B)

The pH of a 1% by mass aqueous solution of each amino group-containing water-soluble polymer (B) was measured as follows. An amino group-containing water-soluble polymer (B) aqueous solution was diluted with ion-exchanged water to the amount of 1% by mass, and its pH was measured at 25° C. using a glass electrode pH meter (product name "Handy pH Meter D-52" made by Horiba, Ltd.).

Residue Rate Upon Impregnation of Component (B) with Dimethyl Carbonate at 25° C. for 24 Hours The amino group-containing water-soluble polymer (B) aqueous solution was dried for 12 hours by a circulating air dryer (product name "DRS420DA" made by ADVANTEC) set to 130° C., and a solid or liquid sample of the amino group-containing water-soluble polymer (B) was obtained. About 1 g of an obtained test piece was weighed in a petri dish, 50 g of dimethyl carbonate was put therein, and the resultant was left to stand at 25° C. for 24 hours. After that, the supernatant amino group-containing water-soluble polymer (B) was removed, and the residue was dried for 1 hour by a circulating air dryer (product name "DRS420DA" made by ADVANTEC) set to 130° C., and the mass thereof was measured.

Residue rate upon impregnation with dimethyl carbonate at 25° C. for 24 hours={(mass after impregnation with dimethyl carbonate and drying)/(mass before impregnation with dimethyl carbonate)}×100(%)

Due to the high residue rate of the amino group-containing water-soluble polymer (B) after impregnation with dimethyl carbonate, the amount of the amino group-containing water-soluble polymer (B) eluted into an electrolytic solution inside a lithium-ion battery after the lithium-ion battery is produced is reduced.

Preparation of Binder Aqueous Solution for Lithium-Ion Battery

Example 1-1

A binder aqueous solution for a lithium-ion battery was prepared using a commercially available homodisper (homogenizing disperser) ("Homodisper Model 2.5" made by PRIMIX Corporation). In a mayonnaise bottle as a container, 15 g of an aqueous solution containing the acidic group-containing water-soluble polymer (A) obtained in Preparation Example 1 was put, deionized water was added so as to achieve a solid content concentration of 1.5%, and the container was set on the above homodisper. Next, the resultant was mixed and stirred at 3,000 rpm for 10 minutes. After that, 0.347 g of 15% polyallylamine aqueous solution ("PAA-15C" made by Nittobo Medical Co., Ltd.) was added, deionized water was further added so as to achieve a solid content concentration of 1.5%, the resultant was mixed and stirred at 3,000 rpm for 30 minutes, and the binder aqueous solution for a lithium-ion battery was obtained. The B-type viscosity of this solution at 25° C. was 16,000 mPa·s.

In the Example 1 series except for Example 1-1, a binder aqueous solution for a lithium-ion battery was prepared in the same manner as in Example 1-1, except that the types and amounts of the acidic group-containing water-soluble polymer (A) and the amino group-containing water-soluble polymer (B) were changed to those shown in the following table.

Comparative Example 1-1

A binder aqueous solution for a lithium-ion battery was prepared using a commercially available homodisper (homogenizing disperser) ("Homodisper Model 2.5" made by PRIMIX Corporation). In a mayonnaise bottle as a container, 15 g of an aqueous solution containing the acidic group-containing water-soluble polymer (A) obtained in Preparation Example 1 was put, deionized water was added so as to achieve a solid content concentration of 1.5%, and the container was set on the above homodisper. Next, the resultant was mixed and stirred at 3,000 rpm for 10 minutes, and the binder aqueous solution for a lithium-ion battery was obtained. The B-type viscosity of this solution at 25° C. was 130 mPa·s.

Comparative Example 1-2

A binder aqueous solution for a lithium-ion battery was prepared using a commercially available homodisper (homogenizing disperser) ("Homodisper Model 2.5" made by PRIMIX Corporation). In a mayonnaise bottle as a container, 15 g of an aqueous solution containing the acidic group-containing water-soluble polymer (A) obtained in Preparation Example 1 was put, deionized water was added so as to achieve a solid content concentration of 1.5%, and the container was set on the above homodisper. Next, the resultant was mixed and stirred at 3,000 rpm for 10 minutes. After that, 0.347 g of 15% polyallylamine hydrochloride aqueous solution was added, deionized water was further added so as to achieve a solid content concentration of 1.5%, the resultant was mixed and stirred at 3,000 rpm for 30 minutes, and the binder aqueous solution for a lithium-ion battery was obtained. The B-type viscosity of this solution at 25° C. was 140 mPa·s.

In the Comparative Example 1 series except for Comparative Examples 1-1 and 1-2, a binder aqueous solution for a lithium-ion battery was prepared in the same manner as in Comparative Example 1-2, except that the types and amounts of the acidic group-containing water-soluble polymer (A) and the amino group-containing water-soluble polymer (B) were changed to those shown in the following table.

TABLE 3

| | Acidic group-containing water-soluble polymer (A) | | Amino group-containing water-soluble polymer (B) | | B-type viscosity [mPa · s] | Water absorption [%] | Acidic group to amino group molar ratio |
|---|---|---|---|---|---|---|---|
| | Type | Amount | Type | Amount | | | |
| Example 1-1 | Preparation Example 1 | 98 | PAA-15C | 2 | 16,000 | 58 | 3.58 |
| Example 1-2 | Preparation Example 1 | 97 | PAA-15C | 3 | 22,000 | 59 | 2.36 |
| Example 1-3 | Preparation Example 1 | 99 | PAA-15C | 1 | 6,900 | 56 | 7.23 |
| Example 1-4 | Preparation Example 2 | 98.5 | PAA-05 | 1.5 | 5,700 | 51 | 1.54 |

TABLE 3-continued

|  | Acidic group-containing water-soluble polymer (A) |  | Amino group-containing water-soluble polymer (B) |  | B-type viscosity [mPa·s] | Water absorption [%] | Acidic group to amino group molar ratio |
| --- | --- | --- | --- | --- | --- | --- | --- |
|  | Type | Amount | Type | Amount |  |  |  |
| Example 1-5 | Preparation Example 2 | 99.5 | PAA-25 | 0.5 | 9,300 | 53 | 4.68 |
| Example 1-6 | Preparation Example 3 | 98 | PAA-15C | 2 | 19,000 | 36 | 1.93 |
| Example 1-7 | Preparation Example 4 | 98 | PAA-15C | 2 | 4,000 | 62 | 4.16 |
| Example 1-8 | Preparation Example 5 | 98 | PAA-15C | 2 | 12,000 | 56 | 1.07 |
| Example 1-9 | Preparation Example 1 | 98 | SP-200 | 2 | 20,000 | 59 | 2.70 |
| Comparative Example 1-1 | Preparation Example 1 | 100 | — | 0 | 130 | — | 0.00 |
| Comparative Example 1-2 | Preparation Example 1 | 98 | Neutralized product of PAA-15C and hydrochloric acid | 2 | 140 | — | 5.87 |
| Comparative Example 1-3 | Comparative Preparation Example 1 | 98 | PAA-15C | 2 | 120 | — | 0.00 |
| Comparative Example 1-4 | Comparative Preparation Example 2 | 98 | PAA-15C | 2 | 150 (producing aggregates) | 75 | 38.76 |
| Comparative Example 1-5 | Comparative Preparation Example 3 | 98 | PAA-15C | 2 | 120 | 118 | 0.00 |
| Comparative Example 1-6 | Comparative Preparation Example 4 | 98 | PAA-15C | 2 | 130 | 84 | 3.04 |
| Comparative Example 1-7 | Comparative Preparation Example 5 | 98 | PAA-15C | 2 | 120 | — | 0.00 |
| Comparative Example 1-8 | Comparative Preparation Example 6 | 98 | PAA-15C | 2 | 13,000 | — | 7.84 |
| Comparative Example 1-9 | Comparative Preparation Example 5 | 98 | PAA-15C | 2 | 5 (producing aggregates) | — | 1.62 |
| Comparative Example 1-10 | Comparative Preparation Example 6 | 98 | PAA-15C | 2 | 5 (producing aggregates) | — | 0.00 |

B-Type Viscosity of Binder Aqueous Solution for Lithium-Ion Battery

The viscosity of each example and comparative example was measured at 25° C. under the following conditions using a B-type viscometer (product name "B-type Viscometer Model BM" made by Toki Sangyo Co., Ltd.).

When the viscosity was 100,000 mPa·s to 20,000 mPa·s: No. 4 rotor was used at a rotational speed of 6 rpm When the viscosity was less than 20,000 mPa·s to 1,000 mPa·s: No. 4 rotor was used at a rotational speed of 12 rpm When the viscosity was less than 1,000 mPa·s: No. 3 rotor was used at a rotational speed of 60 rpm Water Absorption 10 g of the binder aqueous solution for a lithium-ion battery was dried for 12 hours by a circulating air dryer (product name "DRS420DA" made by ADVANTEC) set to 130° C., and the obtained solid was put in a polyethylene bag and pulverized with a wooden hammer to a size of about 5 mm×5 mm. The pulverized solid was put in a vacuum dryer (product name "VO-320P" made by ADVANTEC), vacuumized at 130° C. until a gauge pressure of 76 cmHg or less was achieved, and dried for 12 hours. About 1 g of an obtained test piece was weighed in a petri dish, put in a low temperature constant temperature and humidity chamber (product name "THE051FA" made by ADVANTEC), left to stand at 30° C. and 90% humidity for 3 hours, and the mass thereof was measured.

Water absorption={(mass after standing for 3 hours at 30° C. and 90% humidity)/(mass immediately after drying)}×100−100(%)

Due to the low water absorption of the binder for a lithium-ion battery, the amount of water remaining inside the lithium-ion battery after the lithium-ion battery is prepared is reduced. When water remains in a battery cell, the water is decomposed by an undesired electrochemical reaction in the battery cell, and gas is generated in the battery cell during high temperature storage. When a binder resin has low water absorption, the water remaining in an electrode after drying is reduced, and the water mixed in the cell is reduced. As a result, the generation of gas can be suppressed.

Preparation of Slurry, Production of Cell and Evaluation

Example 2-1

<Preparation of Slurry for Lithium-Ion Battery Negative Electrode>

A slurry was prepared using a commercially available homodisper ("Homodisper Model 2.5" made by PRIMIX Corporation). In a mayonnaise bottle as a container, the binder aqueous solution for a lithium-ion battery as obtained in Example 1-1 in an amount of 2 parts by mass in terms of solid content was mixed with 98 parts by mass of artificial graphite ("G1-A #" made by Jiangxi Zichen Technology Co., Ltd.) having a D50 (median diameter) of 20 μm. Ion-exchanged water was added therein for dilution so that the slurry had a viscosity of 3,000±100 mPa·s. In this example, the solid content concentration was 41%. The container was set on the above homodisper. Next, the resultant was kneaded at 3,000 rpm for 20 minutes. After that, the resultant was subjected to defoaming for 1 minute using a rotation/revolution mixer ("Awatori Rentaro" made by THINKY CORPORATION), and a slurry for a lithium-ion battery negative electrode was obtained.

In the examples and comparative examples other than Example 2-1, a slurry was prepared in the same manner as in Example 2-1, except that the composition in Example 2-1 was changed to those shown in the following table.

punched out to a diameter of 24 mm was placed. Further, after 500 μL of electrolytic solution was poured in so that no air could enter, a commercially available metallic lithium foil punched and formed into a size of 16 mm was placed, and an exterior body of the test cell was fastened and sealed with screws. Thereby, a lithium half-cell was assembled. The electrolytic solution used here was a solution in which $LiPF_6$ was dissolved at a concentration of 1 mol/L in a solvent having a mass ratio of ethylene carbonate to ethyl methyl carbonate of 1/1.

<Charge and Discharge Measurement>

The lithium half-cell was put in a constant temperature bath set to 25° C. and underwent charging and discharging as follows. The charging was started at a constant current (0.1 C) and was completed (cutoff) when the voltage reached

TABLE 4

|  | Negative electrode active material | | Binder aqueous solution for battery | | Other components | | Dispersion stability of electrode slurry [%] | Electrode adhesion [N/m] | Initial Coulombic efficiency [%] |
| --- | --- | --- | --- | --- | --- | --- | --- | --- | --- |
|  | Type | Amount | Type | Amount | Type | Amount |  |  |  |
| Example 2-1 | Graphite | 98 | Example 1-1 | 2 | — | — | A | A | 88 |
| Example 2-2 | Graphite | 98 | Example 1-2 | 2 | — | — | A | A | 89 |
| Example 2-3 | Graphite | 98 | Example 1-3 | 2 | — | — | A | B | 87 |
| Example 2-4 | Graphite | 98 | Example 1-4 | 2 | — | — | A | B | 88 |
| Example 2-5 | Graphite | 98 | Example 1-5 | 2 | — | — | A | A | 88 |
| Example 2-6 | Graphite | 98 | Example 1-6 | 2 | — | — | A | A | 89 |
| Example 2-7 | Graphite | 98 | Example 1-7 | 2 | — | — | A | B | 86 |
| Example 2-8 | Graphite | 98 | Example 1-8 | 2 | — | — | A | A | 87 |
| Example 2-9 | Graphite | 98 | Example 1-9 | 2 | — | — | B | B | 84 |
| Example 2-10 | Graphite | 96 | Example 1-1 | 2 | SBR | 2 | A | A | 88 |
| Comparative Example 2-1 | Graphite | 98 | Comparative Example 1-1 | 2 | — | — | D | D | 83 |
| Comparative Example 2-2 | Graphite | 98 | Comparative Example 1-2 | 2 | — | — | D | C | 82 |
| Comparative Example 2-3 | Graphite | 98 | Comparative Example 1-3 | 2 | — | — | D | D | 86 |
| Comparative Example 2-4 | Graphite | 98 | Comparative Example 1-4 | 2 | — | — | D | D | 75 |
| Comparative Example 2-5 | Graphite | 98 | Comparative Example 1-5 | 2 | — | — | D | D | 85 |
| Comparative Example 2-6 | Graphite | 98 | Comparative Example 1-6 | 2 | — | — | D | D | 82 |
| Comparative Example 2-7 | Graphite | 98 | Comparative Example 1-7 | 2 | — | — | D | C | 85 |
| Comparative Example 2-8 | Graphite | 98 | Comparative Example 1-8 | 2 | — | — | C | D | 83 |
| Comparative Example 2-9 | Graphite | 98 | Comparative Example 1-9 | 2 | — | — | D | D | 74 |
| Comparative Example 2-10 | Graphite | 98 | Comparative Example 1-10 | 2 | — | — | D | D | 76 |

SBR: Styrene-butadiene rubber

<Assembly of Lithium Half-Cell>

The above slurry was uniformly applied to a surface of a current collector (20 μm) composed of copper foil by a doctor blade method so that a film thickness after drying would be 170 μm. After drying at 150° C. for 30 minutes, the resultant was subjected to a heating treatment at 150° C. in vacuum for 120 minutes, and an electrode was obtained. After that, by press processing by a roll press machine to achieve a film (electrode active material layer) density of 1.5 g/cm³, a negative electrode was obtained.

In an argon-purged glove box, the above negative electrode was punched and formed to have a diameter of 16 mm, and the resultant was placed inside a packing above an aluminum lower lid of a test cell (made by Nippon Tomcell Co., Ltd.). Next, a separator ("Selion P2010" made by CS Tech Co., Ltd.) composed of a polypropylene porous film 0.01 V. Next, the discharging was started at a constant current (0.1 C) and was completed (cutoff) when the voltage reached 1.0 V.

In the above measurement conditions, "1 C" indicates a current value at which a cell having a certain electric capacity is discharged at a constant current and the discharging is completed in 1 hour. For example, "0.1 C" means a current value at which it takes 10 hours to complete discharging, and "10 C" means a current value at which it takes 0.1 hour to complete discharging.

<Test for Dispersion Stability of Slurry>

6 g of the above slurry was put in a reinforced hard screw capped test tube (made by NICHIDEN RIKA GLASS CO., LTD.) and centrifuged at 1,000 rpm for 3 minutes using a small-sized tabletop centrifuge ("H-11n" made by KOKUSAN Co., Ltd.). The solid content of each of the slurry before centrifugation and the supernatant liquid of the slurry after centrifugation was measured. As for the solid content, 1 g of the slurry was put in an ointment can (product name "Ointment Can made of tinplate" made by SOGO LABORATORY GLASS WORKS CO., LTD.), and after drying at 130° C. for 1 hour by a circulating air dryer (product name "Blower Constant Temperature Dryer DSR420DA" made by Advantec Toyo Kaisha, Ltd.), a solid of the slurry was obtained. The solid content was calculated from the following equation: Solid content (%)={mass (g) of solid after drying/mass (g) of slurry before drying}×100 The dispersion stability of the slurry was calculated from the following equation and evaluated according to the following evaluation criteria.

$$\text{Dispersion stability (\%) of slurry} = \{\text{mass (g) of solid after drying/mass (g) of slurry before drying}\} \times 100$$

A: 90% or more
B: 80% or more and less than 90%
C: 50% or more and less than 80%
D: less than 50%

<Evaluation of Electrode Adhesion>

The electrode adhesion was evaluated as follows.

A test piece of 2 cm in width×10 cm in length was cut out from the electrode. After a double-sided adhesive tape ("NICETACK™" made by NICHIBAN Co., Ltd.) of 20 mm in width was attached while being pressed onto a surface of an active material layer of the test piece, the test piece was stuck on a piece of paper with a current collector surface facing up. The stress when the current collector was peeled off from one end of the test piece at a speed of 30 mm/min in the 180° direction was measured using a tensile tester ("TENSILON®-100" made by A&D Company, Limited) at 25° C. The measurement was performed 5 times, the measured stress was converted into a value per width of 20 mm, and an average value thereof was calculated as peel strength. The higher the peel strength, the higher the adhesion strength between the current collector and the active material layer or the binding property between the active materials, indicating that the active material layer is less likely to be peeled from the current collector or the active materials are less likely to be peeled from each other.

The evaluation was performed as follows based on the value of the peel strength.

A: Peel strength was greater than 5 N/m.
B: Peel strength was greater than 3 N/m and 5 N/m or less.
C: Peel strength was 0.5 N/m to 3 N/m.
D: Peel strength was less than 0.5 N/m.

<Measurement of Initial Coulombic Efficiency>

The initial Coulombic efficiency was calculated by the following equation from values of initial charge capacity (mAh) and initial discharge capacity (mAh) when a charge and discharge cycle test was carried out at room temperature (25° C.).

$$\text{Initial Coulombic efficiency} = \{(\text{initial discharge capacity})/(\text{initial charge capacity})\} \times 100$$

What is claimed is:

1. A binder aqueous solution for a lithium-ion battery, containing:
    an acidic group-containing water-soluble polymer (A) being a polymer of a monomer group containing, with respect to 100 mol % of the monomer group,
        30 mol % to 90 mol % of a (meth)acrylamide group-containing compound (a),
        3 mol % to 20 mol % of an unsaturated organic acid (b), and
        5 mol % to 40 mol % of an alkali metal or alkaline earth metal salt (c) of the unsaturated organic acid; and
    an amino group-containing water-soluble polymer (B), a 1% by mass aqueous solution thereof having a pH of 9 or higher.

2. The binder aqueous solution for a lithium-ion battery according to claim 1, wherein an acidic group to amino group molar ratio of an acidic group contained in the acidic group-containing water-soluble polymer (A) to an amino group contained in the amino group-containing water-soluble polymer (B) is 1 to 15.

3. The binder aqueous solution for a lithium-ion battery according to claim 1, wherein the amino group-containing water-soluble polymer (B) has a molecular weight of 1,600 to 50,000.

4. The binder aqueous solution for a lithium-ion battery according to claim 1, wherein a residue rate upon impregnation of the amino group-containing water-soluble polymer (B) with dimethyl carbonate at 25° C. for 24 hours is 20% by mass or more.

5. The binder aqueous solution for a lithium-ion battery according to claim 1, wherein the amino group-containing water-soluble polymer (B) is polyallylamine.

6. A slurry for a lithium-ion battery negative electrode, containing:
    the binder aqueous solution for a lithium-ion battery electrode according to claim 1, and
    a negative electrode active material (C).

7. A negative electrode for a lithium-ion battery, obtained by applying the slurry for a lithium-ion battery negative electrode according to claim 6 to a metal foil and drying the same.

8. A lithium-ion battery, comprising the negative electrode for a lithium-ion battery according to claim 7.

9. The binder aqueous solution for a lithium-ion battery according to claim 2, wherein the amino group-containing water-soluble polymer (B) has a molecular weight of 1,600 to 50,000.

10. The binder aqueous solution for a lithium-ion battery according to claim 2, wherein a residue rate upon impregnation of the amino group-containing water-soluble polymer (B) with dimethyl carbonate at 25° C. for 24 hours is 20% by mass or more.

11. The binder aqueous solution for a lithium-ion battery according to claim 3, wherein a residue rate upon impregnation of the amino group-containing water-soluble polymer (B) with dimethyl carbonate at 25° C. for 24 hours is 20% by mass or more.

12. The binder aqueous solution for a lithium-ion battery according to claim 9, wherein a residue rate upon impregnation of the amino group-containing water-soluble polymer (B) with dimethyl carbonate at 25° C. for 24 hours is 20% by mass or more.

13. The binder aqueous solution for a lithium-ion battery according to claim 2, wherein the amino group-containing water-soluble polymer (B) is polyallylamine.

14. The binder aqueous solution for a lithium-ion battery according to claim 3, wherein the amino group-containing water-soluble polymer (B) is polyallylamine.

15. The binder aqueous solution for a lithium-ion battery according to claim 4, wherein the amino group-containing water-soluble polymer (B) is polyallylamine.

16. The binder aqueous solution for a lithium-ion battery according to claim 9, wherein the amino group-containing water-soluble polymer (B) is polyallylamine.

17. The binder aqueous solution for a lithium-ion battery according to claim 12, wherein the amino group-containing water-soluble polymer (B) is polyallylamine.

\* \* \* \* \*